(12) United States Patent
Sone et al.

(10) Patent No.: US 10,567,082 B2
(45) Date of Patent: Feb. 18, 2020

(54) OPTICAL TERMINAL DEVICE, OPTICAL TERMINATING DEVICE, AND COMMUNICATION CONTROL METHOD

(71) Applicant: FUJITSU LIMITED, Kawasaki-shi, Kanagawa (JP)

(72) Inventors: Kyosuke Sone, Kawasaki (JP); Goji Nakagawa, Sagamihara (JP); Yoshio Hirose, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/975,101

(22) Filed: May 9, 2018

(65) Prior Publication Data

US 2018/0359032 A1    Dec. 13, 2018

(30) Foreign Application Priority Data

Jun. 9, 2017 (JP) ................................. 2017-114563

(51) Int. Cl.
*H04B 10/2575* (2013.01)
*H04W 52/02* (2009.01)

(52) U.S. Cl.
CPC .. *H04B 10/25752* (2013.01); *H04W 52/0206* (2013.01); *H04W 52/0222* (2013.01); *H04B 2210/08* (2013.01)

(58) Field of Classification Search
CPC ......... H04B 10/25752; H04B 2210/08; H04W 52/0206; H04W 52/0222
See application file for complete search history.

(56) References Cited

U.S. PATENT DOCUMENTS

| | | | |
|---|---|---|---|
| 2009/0010650 A1* | 1/2009 | Tsuchiya | H04J 3/0602 398/59 |
| 2015/0373640 A1 | 12/2015 | Iiyama et al. | |
| 2016/0295521 A1* | 10/2016 | Grayson | H04W 4/02 |
| 2017/0063486 A1* | 3/2017 | Sarashina | H04J 14/0221 |

FOREIGN PATENT DOCUMENTS

| | | |
|---|---|---|
| JP | 2011-103570 | 5/2011 |
| JP | 2011-176555 | 9/2011 |
| JP | 2014-127803 | 7/2014 |
| WO | WO 2014/103804 A1 | 7/2014 |

* cited by examiner

*Primary Examiner* — Casey L Kretzer
(74) *Attorney, Agent, or Firm* — Staas & Halsey LLP

(57) ABSTRACT

An optical terminal device includes: a relay processing circuitry relaying communication between first base stations, respectively connected to optical terminating devices at branch destinations of a transmission path, and a control device controlling the first base stations in accordance with information acquired from a second base station covering a cell overlapping cells of the first base stations; a detecting circuitry detecting a sleep control instruction, issued for one of the first base stations from the control device, from the communication being relayed by the relay processing circuitry; and a control circuitry performing control, via the transmission path, to cause the optical terminating device connected to the one of the first base stations to shift to an operating state or a sleep state, which consumes less power than the operating state, in response to detection of the sleep control instruction, the optical terminating device being one of the optical terminating devices.

9 Claims, 15 Drawing Sheets

OPTICAL TERMINAL DEVICE, OPTICAL TERMINATING DEVICE, AND COMMUNICATION CONTROL METHOD

CROSS-REFERENCE TO RELATED APPLICATION

This application is based upon and claims the benefit of priority of the prior Japanese Patent Application No. 2017-114563 filed on Jun. 9, 2017, the entire contents of which are incorporated herein by reference.

FIELD

A certain aspect of the embodiments described herein relates to an optical terminal device, an optical terminating device, and a communication control method.

BACKGROUND

As mobile terminals such as smartphones have become common, the number of base stations that connect mobile terminals to wireless communication networks have been increasing. Particularly, the number of small cell base stations that cover small cells overlapping macro cells is increasing, to compensate for local shortage of bandwidth of the macro cell base stations that cover the macro cells (see Japanese Laid-open Patent Publication No. 2011-103570 (hereinafter, referred to as Patent Document 1), for example).

In some cases, a passive optical network (PON) with low optical fiber installation costs is used as a mobile backhaul network that connects a large number of base stations to a device on a higher order (see International Publication Pamphlet No. WO 2014/103804 and Japanese Laid-open Patent Publication No. 2011-176555 (hereinafter, respectively referred to as Patent Documents 2 and 3), for example). The IEEE (the Institute of Electrical and Electronics Engineers, Inc.) 802.3ah specifies techniques relating to GE (Gigabit Ethernet)-PON of 1 Gps or higher, which is compliant with Ethernet (registered trademark, which also applies in the description below), for example.

A PON is a star-like access optical network in which an optical terminal device and optical terminating devices are connected via an optical coupler that splits light. An optical terminal device is called an optical line termination (OLT) or the like, and an optical terminating device is called an optical network unit (ONU) or the like. In a case where a PON is used as a mobile backhaul network, not only the costs for optical fiber installation can be lowered, but also can traffics of base stations be transmitted by a single OLT.

SUMMARY

According to an aspect of the embodiments, there is provided an optical terminal device including: a relay processing circuitry that relays communication between a plurality of first base stations and a control device, the plurality of first base stations being respectively connected to a plurality of optical terminating devices at branch destinations of a transmission path, the control device controlling each of the first base stations in accordance with information acquired from a second base station, the second base station covering a cell overlapping respective cells of the first base stations; a detecting circuitry detects a sleep control instruction from the communication being relayed by the relay processing circuitry, the sleep control instruction being issued for one of the first base stations from the control device; and a control circuitry that performs control, via the transmission path, to cause the optical terminating device connected to the one of the first base stations to shift to one of an operating state and a sleep state in response to detection of the sleep control instruction, the optical terminating device being one of the optical terminating devices, the sleep state consuming less power than the operating state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As the number of small cell base stations increases, radio wave interference among the small cell base stations becomes more conspicuous, and communication quality might be degraded. Therefore, sleep control may be performed on the small cell base stations linked to small numbers of mobile terminals, to reduce the influence of radio wave interference and power consumption by the small cell base stations.

In a case where small cell base stations are connected to a device on a higher order via a PON, sleep control is performed on the ONUs connected to the small cell base stations in coordination with sleep control on the small cell base stations. In this manner, power consumption in the entire network can be further reduced.

However, in a case where an ONU is put into a sleep state in accordance with information from an eNB, as disclosed in Patent Document 2, for example, the ONU needs to prepare for cancellation of the sleep setting, and therefore, it is difficult to suspend the power supply to the transmission/reception circuit on the power-consuming eNB side for a long time. Because of this, the ONU needs to supply power to the transmission/reception circuit on the eNB side on a regular basis, for example.

Further, in a case where an OLT performs control so that the ONU corresponding to the base station as the suspension target in a surveillance control system is put into a standby state, as disclosed in Patent Document 3, for example, the surveillance control system cannot detect the state of the suspended base station, and therefore, is unable to determine whether to put the suspended base station back into the operating state. Because of this, the OLT needs to periodically return each ONU to the operating state, to enable the surveillance control system to detect the states of the base stations.

As described above, ONU sleep control has temporal restrictions, and therefore, power consumption in the network cannot be effectively reduced.

Figure 1:
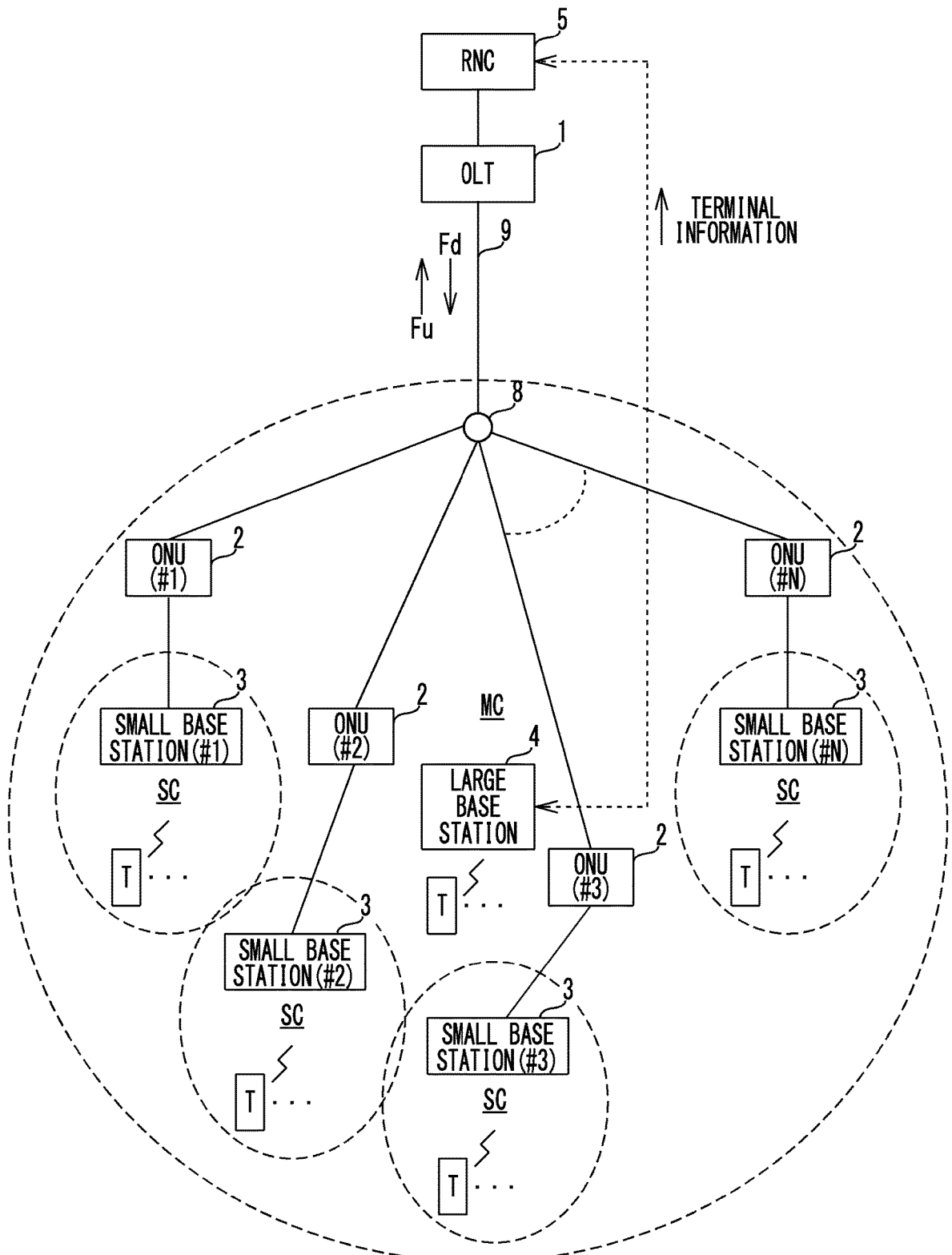
FIG. 1 is a configuration diagram showing an example of a network.

FIG. 1 is a configuration diagram showing an example of a network. The network includes an OLT 1, ONUs (#1 through #N (N being an integer) 2, small base stations (#1 through #N) 3, a large base station 4, a radio network controller (RNC) 5, and mobile terminals T.

The OLT 1 and the ONUs 2 are connected via a branched optical fiber 9, to form a PON. The PON is used as a mobile backhaul network that connects the small base stations 3 and the RNC 5 in a wireless communication network. In this configuration, the PON relays communications between the RNC 5 and the small base stations 3. The PON may be GE-PON, which is specified in IEEE802.3ah, for example, but is not necessarily GE-PON.

The OLT 1 is an optical terminal device installed in an office of a telecommunications carrier, for example, and the ONUs 2 are optical terminating devices housed in outdoor cabinets, for example. The OLT 1 is connected to the ONUs 2 via the optical fiber 9 that is an example of the transmission path. The optical fiber 9 is split into branches by an optical coupler 8. The ONUs 2 are connected to the respective branch destinations of the optical fiber 9.

Each ONU 2 is connected to a small base station 3 via a local area network (LAN), for example. Each small base station 3 is an example of a first base station. Each small base station 3 covers a small cell SC (see circles drawn with dashed lines), and links to and communicates with a mobile terminal T in the small cell SC. The mobile terminal T may be a smartphone, for example, but is not necessarily a smartphone.

The large base station 4 is an example of the second base station, and covers a macro cell MC (see a circle drawn with a dashed line) that overlaps with the small cells SC of the respective small base stations 3. Therefore, the macro cell MC has a larger area than all the small cells SC. The macro cell MC and the small cells SC are an example of the cells.

The large base station 4 is a macro cell base station, for example, and the small base stations 3 are small cell base stations, for example. The small base stations 3 are provided to compensate for local shortage of bandwidth of the large base station 4.

The large base station 4 links to and communicates with the mobile terminals T in the macro cell MC, except for the mobile terminals T linked to the small base stations 3. However, the large base station 4 can detect the location and the state of a mobile terminal T not linked to its own device, from radio waves emitted from the mobile terminal T in the macro cell MC, for example. From detection results, the large base station 4 generates terminal information indicating the number of mobile terminals T for each small cell SC, for example.

As indicated by a dotted line, the RNC 5 communicates with the large base station 4 via a predetermined network. The RNC 5 acquires various kinds of information from the large base station 4, and, in accordance with the information, controls the respective small base stations 3. The RNC 5 performs communication channel setting, bandwidth setting, sleep control, and the like on the small base stations 3.

The RNC 5 also communicates with the respective small base stations 3 via the PON. Therefore, the RNC 5 is connected to the service network interface (SNI) of the OLT 1, and the small base stations 3 are connected to the user network interfaces of the ONUs 2 at the branch destinations of the optical fiber 9. It should be noted that the RNC 5 is an example of the control device that controls the small base stations 3.

A PON is a star-like access optical network in which the OLT 1 and the ONUs 2 are connected via the optical coupler 8. Accordingly, in a case where a PON is used as a mobile backhaul network, not only the costs for installation of the optical fiber 9 can be lowered, but also can traffics of the small base stations 3 be transmitted by a single OLT.

In this specification, the direction of transmission from the OLT 1 toward the respective ONUs 2 is referred to as the "downlink direction", and the direction of transmission from the respective ONUs 2 toward the OLT 1 is referred to as the "uplink direction". Between the OLT 1 and each ONU 2, one or more logical links (LLs) are established through a predetermined sequence. The OLT 1 transmits downlink frames Fd to the ONUs 2, and the ONUs 2 transmit uplink frames Fu to the OLT 1. Logical link identifiers (LLIDs) for the OLT 1 and the ONUs 2 to identify the logical links are attached to the downlink frames Fd and the uplink frames Fu.

The respective ONUs 2 transmit the uplink frames Fu at times that are designated for the respective logical links by the OLT 1. Therefore, the uplink frames Fu (#1) through Fu (#n) transmitted from the respective ONUs 2 do not collide with one another in the optical fiber 9.

Meanwhile, the OLT 1 transmits the downlink frames Fd to the respective ONUs 2 in a time-division multiplexing manner. Each ONU 2 selects only the downlink frame Fd addressed to its own device in accordance with the LLID, transmits the downlink frame Fd to the small base station 3, and discards the downlink frames Fd addressed to the other ONUs 2. In this manner, the downlink frames Fd are transmitted from the RNC 5 to the destination small base stations 3 via the PON. The uplink frames Fu and the downlink frames Fd may be Ethernet frames, but are not necessarily Ethernet frames.

As the number of small base stations 3 increases, radio wave interference among the small base stations 3 becomes more conspicuous, and communication quality might be degraded. Therefore, the RNC 5 performs sleep control on the small base stations 3 linked to small numbers of mobile terminals, to reduce the influence of radio wave interference and power consumption by the small base stations 3.

The RNC 5 acquires terminal information about the distribution of the mobile terminals T in each small SC from the large base station 4, for example, and controls the small base stations 3 in accordance with the terminal information. The RNC 5 performs sleep control on the small base stations 3 each having not more than a predetermined number (three, for example) of mobile terminals T in the small cell SC, for example. It should be noted that the terminal information is an example of information the RNC acquires from the large base station 4.

To match the sleep control on the small base stations 3, the OLT 1 performs sleep control on the ONUs 2 connected to the small base stations 3 on which the sleep control is performed. In this manner, power consumption in the entire network is further reduced. In the following, a sequence in a sleep start process for the small base station 3 and an ONU 2 is described.

Figure 2:
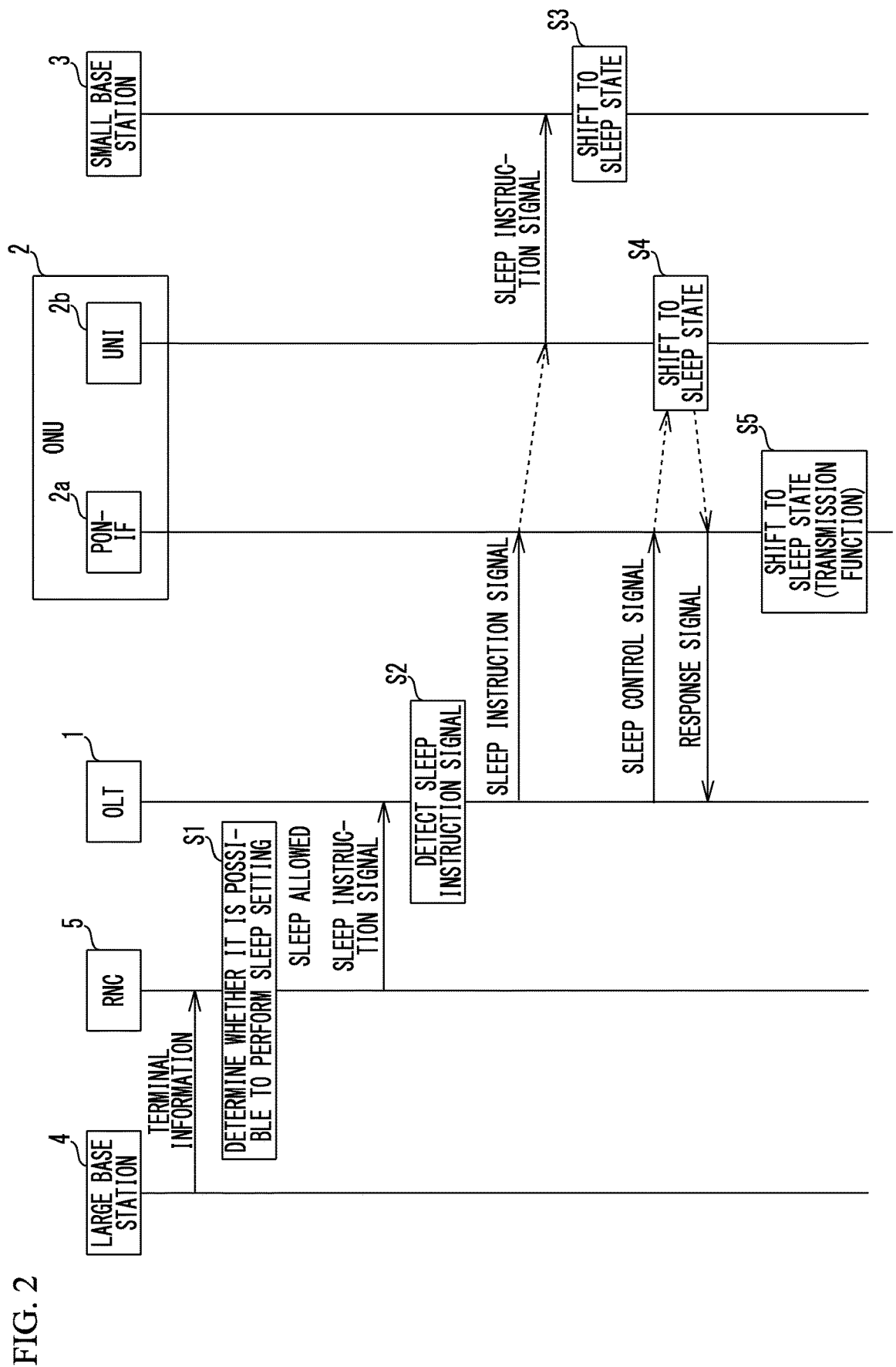
FIG. 2 is a sequence diagram showing an example of a sleep start process.

FIG. 2 is a sequence diagram showing an example of the sleep start process. In this example, one small base station 3 and its ONU 2 are put into a sleep state. In a case where two or more small base stations 3 and their ONUs 2 are put into a sleep state, the same sleep process as the process described below is repeated.

The large base station 4 detects the distribution state of the mobile terminals T, generates terminal information, and transmits the terminal information to the RNC 5. The large base station 4 may transmit the terminal information in response to a request from the RNC 5, or may periodically transmit the terminal information.

In accordance with the terminal information, the RNC 5 determines whether it is possible to perform sleep setting on the respective small base stations 3 (S1). In a case where the RNC 5 determines that it is possible to perform sleep setting on the small base station 3 (see "sleep allowed"), the RNC 5 transmits a signal for switching the small base station 3 to a sleep state (this signal will be hereinafter referred to as the "sleep instruction signal"), to the OLT 1. It should be noted that the sleep instruction signal is an example of a sleep control instruction to be issued from the RNC 5 for the small base station 3.

The OLT 1 relays a downlink frame Fd from the RNC 5 to the small base station 3. The OLT 1 detects the sleep instruction signal from the downlink frame Fd (S2). The sleep instruction signal is detected in accordance with a predetermined identifier (such as a command code) in the downlink frame Fd, for example.

The OLT 1 then transmits the sleep instruction signal to the ONU 2. The ONU 2 includes a PON interface (PON-IF) 2a that communicates with the OLT 1 via the optical fiber 9, and a UNI 2b that communicates with the small base station 3. The UNI 2b is an example of the first communication processing circuitry, and the PON-IF 2a is an example of the second communication processing circuitry.

The ONU 2 receives the sleep instruction signal at the PON-IF 2a. The sleep instruction signal is transferred from the PON-IF 2a to the UNI 2b that communicates with the small base station 3 (see a dotted line), and is transferred from the UNI 2b to the small base station 3. In accordance with the sleep instruction signal, the small base station 3 shifts from the operating state to the sleep state (S3). The sleep state is a state in which the power consumption is smaller than in the operating state. This definition also applies to the ONU 2.

In response to detection of the sleep instruction signal, the OLT 1 controls the state of the ONU 2 to shift to the sleep state, via the optical fiber 9. More specifically, the OLT 1 transmits a control signal for causing the ONU 2 to shift from the operating state to the sleep state (this control signal will be hereinafter referred to as the "sleep control signal"), to the ONU 2.

The ONU 2 receives the sleep control signal at the PON-IF 2a, and, in accordance with the sleep control signal, causes the UNI 2b to shift to the sleep state (S4). The ONU 2 then transmits a response signal for notifying the OLT 1 of completion of the sleep control, and causes only the transmission function of the PON-IF 2a to shift to the sleep state (S5). By doing so, the ONU 2 can put the transmission function of the PON-IF 2a and the UNI 2b into the sleep state.

In this manner, the sleep start process is performed. It should be noted that the sleep start process is an example of the communication control method. The structures of the uplink frames Fu and the downlink frames Fd are now described.

Figure 3:
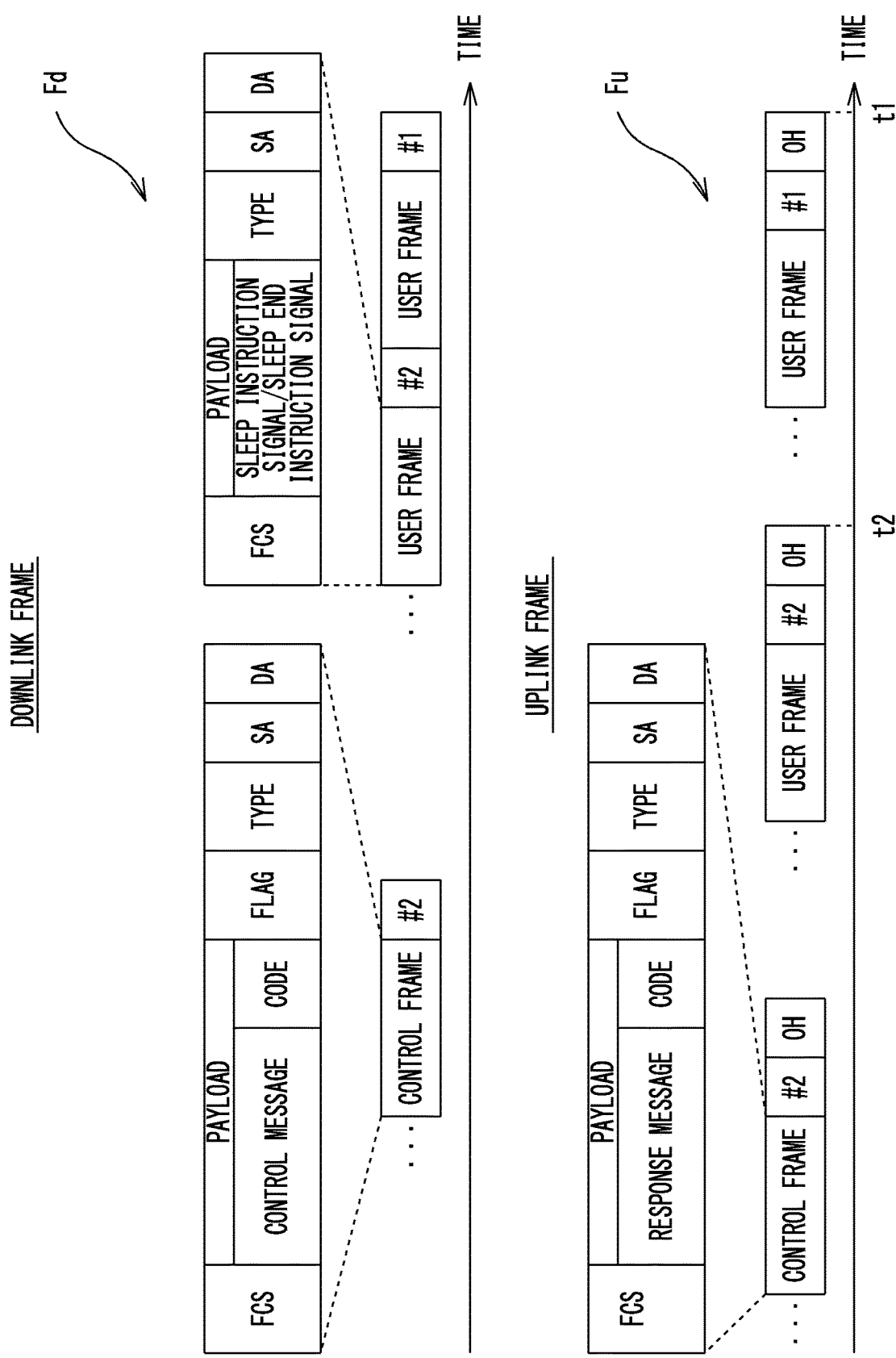
FIG. 3 is a diagram showing examples of an uplink frame and a downlink frame.

FIG. 3 is a diagram showing an example of the uplink frames Fu and the downlink frames Fd. The abscissa axis in FIG. 3 indicates time. The LLIDs (#1 through #N) corresponding t to the ONUs 2 as the transmission destinations are attached to the uplink frames Fu, and the LLIDs corresponding to the ONUs 2 as the transmission sources are attached to the downlink frames Fd.

The OLT 1 transmits the downlink frames Fd addressed to the respective ONUs 2 in a time-division multiplexing manner. Meanwhile, the respective ONUs 2 transmit the uplink frames Fu at times t1, t2, . . . , which are designated for the respective logical links by the OLT 1. An overhead OH including a synchronization pattern for the OLT 1 to detect the uplink frames Fu is attached to the heads of the uplink frames Fu.

The uplink frames Fu and the downlink frames Fd include the user frames to be exchanged between the RNC 5 and the small base station 3, and the control frames to be exchanged between the OLT 1 and the ONUs 2. The uplink frames Fu and the downlink frames Fu each include a destination address (DA) indicating a destination, a source address (SA) indicating a transmission source, a flag, a type indicating a frame type, a payload, and a frame check sequence (FCS) of error correction codes. The flag indicates whether an optical network terminal management and control interface (OMCI) message (a control message and a response message) is included in the uplink frame Fu or the downlink frame Fd.

Some of the payloads of the user frames in the downlink direction contain a sleep instruction signal or a sleep end instruction signal issued from the RNC 5 toward the small base station 3. The OLT 1 detects the sleep instruction signal or the sleep end instruction signal, in accordance with a predetermined identifier. It should be noted that the sleep end instruction signal is a signal issued from the RNC 5 to instruct the small base station 3 to end the sleep control.

Meanwhile, the payloads of the control frames in the downlink direction each contain a control message and a code indicating a message type. The control message may be a sleep start message for putting the ONU 2 into the sleep state, or a sleep end message for putting the ONU 2 into the operating state. The sleep start message corresponds to the above mentioned sleep control signal, and the sleep end message corresponds the sleep end control signal that will be described later. Alternatively, the control message may be a message for establishing a logical link between the OLT 1 and the ONU 2, and assigning an LLID to the ONU 2 from the OLT 1.

The payloads of the control frames in the uplink direction each contain a response message and a code indicating a message type. The response message is a response of the ONU 2 to a control message from the OLT 1, and corresponds to the above described response signal.

Next, a sequence in a sleep end process for the small base station 3 and the ONUs 2 is described.

Figure 4:
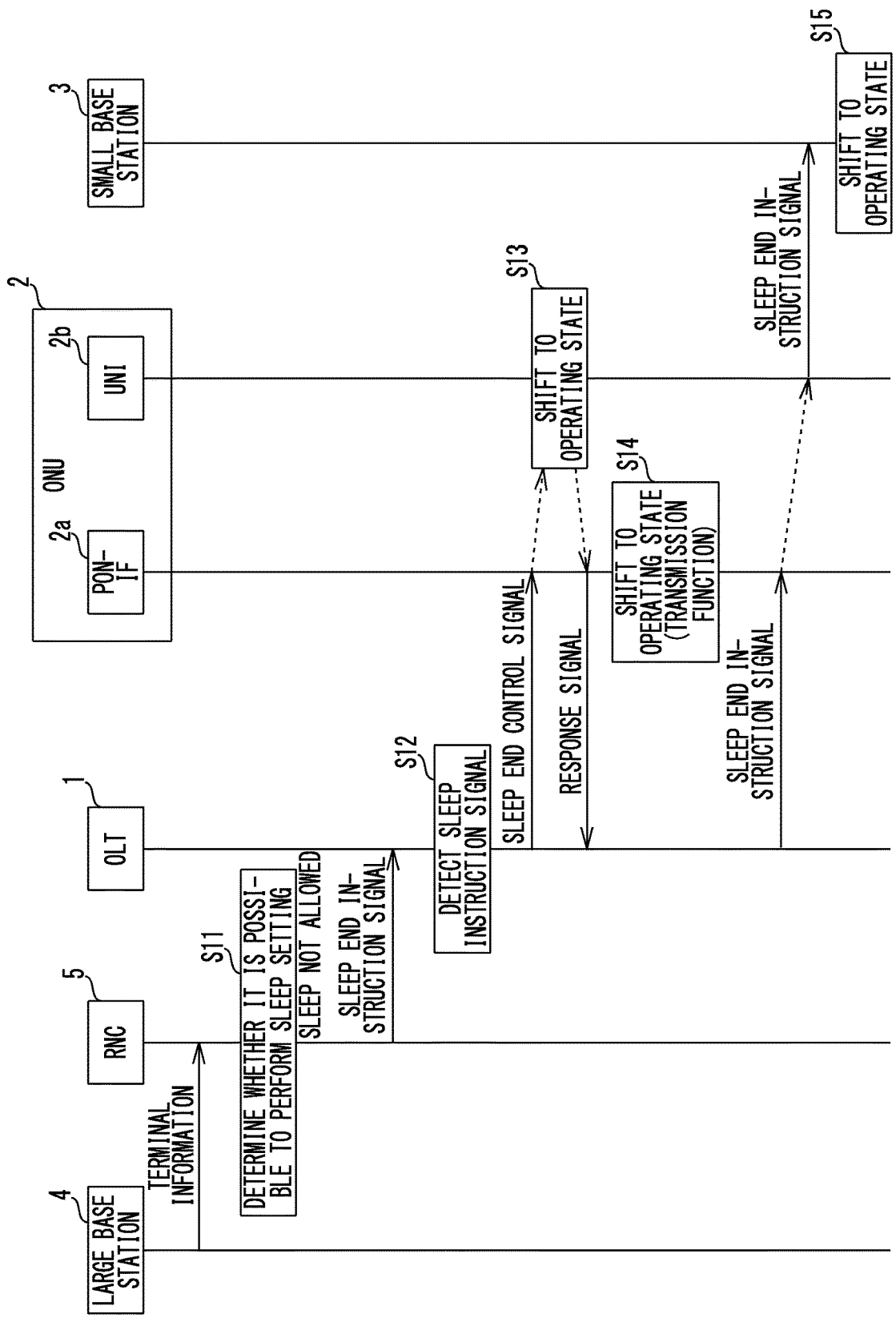
FIG. 4 is a sequence diagram showing an example of a sleep end process.

FIG. 4 is a sequence diagram showing an example of the sleep end process. The large base station 4 detects the distribution state of the mobile terminals T, generates terminal information, and transmits the terminal information to the RNC 5.

In accordance with the terminal information, the RNC 5 determines whether it is possible to perform sleep setting on the small base station 3 (S11). In a case where the RNC 5 determines that it is impossible to perform sleep setting on the small base station 3 (see "sleep not allowed"), the RNC 5 transmits a signal instructing the small base station 3 to shift to the operating state (this signal will be hereinafter referred to as the "sleep end instruction signal"), to the OLT 1. It should be noted that the sleep end instruction signal is an example of a sleep control instruction from the RNC 5 to the small base station 3.

The OLT 1 detects the sleep end instruction signal from a downlink frame Fd (S12). The sleep end instruction signal is detected in accordance with a predetermined identifier (such as a command code) in the downlink frame Fd, for example.

In response to detection of the sleep end instruction signal, the OLT 1 controls the state of the ONU 2 to shift to the sleep state, via the optical fiber 9. More specifically, the OLT 1 transmits a control signal for causing the ONU 2 to shift from the sleep state to the operating state (this control signal will be hereinafter referred to as the "sleep end control signal"), to the ONU 2.

The ONU 2 receives the sleep end control signal at the PON-IF 2a, and, in accordance with the sleep end control signal, causes the UNI 2b to shift to the operating state (S13). The ONU 2 then transmits a response signal for notifying the OLT 1 of completion of the sleep control, and causes the transmission function of the PON-IF 2a to shift to the operating state (S14). By doing so, the ONU 2 can put the transmission function of the PON-IF 2a and the UNI 2b back into the operating state.

After transmitting the sleep end control signal, the OLT 1 transmits the sleep end instruction signal to the ONU 2. Thus, the ONU 2 can return the transmission function of the PON-IF 2a and the UNI 2b to the operating state, prior to transmission of the sleep end instruction signal to the small base station 3.

The ONU 2 receives the sleep end instruction signal at the PON-IF 2a. The sleep end instruction signal is transferred from the PON-IF 2a to the UNI 2b (see a dotted line), and is transmitted from the UNI 2b to the small base station 3. In accordance with the sleep end instruction signal, the small base station 3 shifts from the sleep state to the operating state (S15).

In this manner, the sleep end process is performed. It should be noted that the sleep end process is an example of the communication control method.

As described above, the RNC 5 controls the small base stations 3 in accordance with terminal information acquired from the large base station 4. The OLT 1 relays communications between the RNC 5 and the small base stations 3, and, from a communication being relayed, detects a sleep control instruction issued from the RNC to the small base station 3. In response to detection of the sleep control instruction, the OLT 1 controls the ONU 2 connected to the instruction target small base station 3 to shift to the operating state or the sleep state, via the optical fiber 9.

The ONU 2 communicates with the small base station 3 through the UNI 2b, and communicates with the OLT 1 via the PON-IF 2a via the optical fiber 9. The ONU 2 transfers the sleep control instruction from the PON-IF 2a to the UNI 2b, and, under the control of the OLT 1, puts the UNI 2b into the operating state or the sleep state.

The RNC 5 controls the small base stations 3 in accordance with the terminal information acquired from the large base station 4. Accordingly, even if the UNI 2b of the ONU 2 is in the sleep state, the RNC 5 can detect the state of the small base station 3 connected to the ONU 2 from the terminal information. Thus, in detecting the state of the small base station 3, the RNC 5 does not need to control the UNI 2b of the ONU 2 to shift to the operating state as disclosed in Patent Document 3.

In response to detection of a sleep control signal issued from the RNC 5 to the small base station 3, the OLT 1 controls the ONU 2 to shift to the operating state or the sleep state, via the optical fiber 9. In turn, the ONU 2 transfers the sleep control signal from the PON-IF 2a to the UNI 2b, and, under the control of the OLT 1, puts the UNI 2b into the operating state or the sleep state.

Accordingly, sleep control is performed on the ONU 2 by the OLT 1 through the PON-IF 2a, and the temporal restriction on putting the UNI 2b into the sleep state is reduced. Thus, by the above described communication control method, it is possible to improve the power saving performance of a network.

Next, the configuration of the OLT 1 is described.

Figure 5:
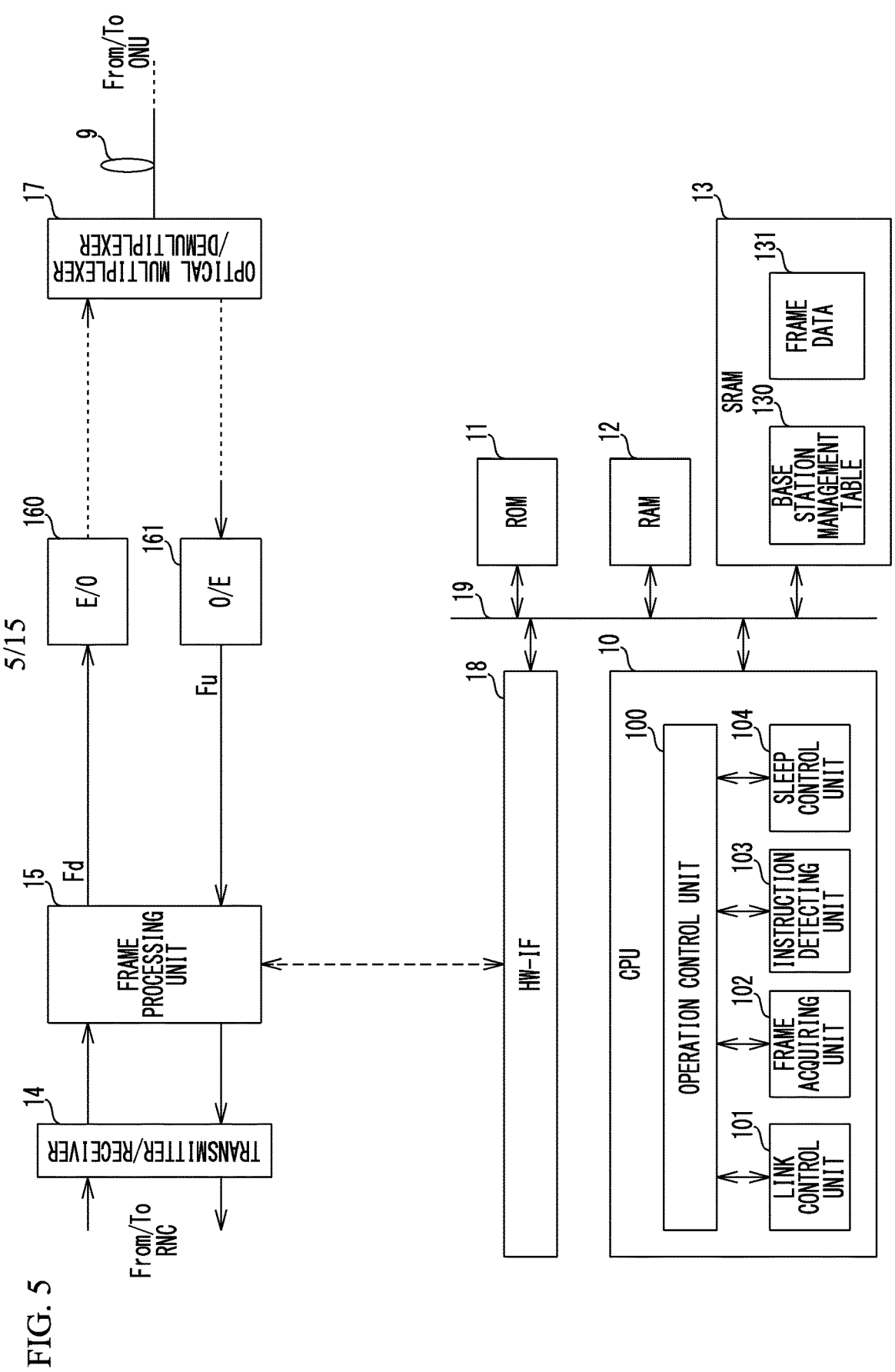
FIG. 5 is a configuration diagram showing an example of an OLT.

FIG. 5 is a configuration diagram showing an example of the OLT 1. The OLT 1 includes a central processing unit (CPU) 10, a read only memory (ROM) 11, a random access memory (RAM) 12, a static RAM (SRAM) 13, and a hardware interface unit (HW-IF) 18. The CPU 10 is connected to the ROM 11, the RAM 12, the SRAM 13, and the HW-IF 18 via a bus 19, so that signals can be input and output to and from one another. Instead of the CPU 10, some other processor such as a micro processor unit (MPU) may be used. Instead of the SRAM 13, some other storage means may be used.

The OLT 1 includes a transmitter/receiver 14, a frame processing unit 15, an optical multiplexer/demultiplexer 17, an electrical-optical converting unit (E/O) 169, and an optical-electrical converting unit (O/E) 161.

The optical multiplexer/demultiplexer 17 is a wavelength division multiplexing (WDM) coupler, for example. The optical multiplexer/demultiplexer 17 guides optical signals input from the respective ONUs 2 via the optical fiber 9 to the optical-electrical converting unit 161, and guides an optical signal input from an electrical-optical converting unit 160 to the optical fiber 9. It should be noted that the arrows with dotted lines between the optical multiplexer/demultiplexer 17, and the optical-electrical converting unit 161 and the electrical-optical converting unit 160 indicate the output directions of optical signals.

The optical-electrical converting unit 161 is formed with a circuit such as a photodiode. The optical-electrical converting unit 161 converts an optical signal input from the optical multiplexer/demultiplexer 17 into an electrical signal, and outputs the electrical signal to the frame processing unit 15. The electrical signal includes an uplink frame Fu. The electrical-optical converting unit 160 is formed with a circuit including a laser diode or the like. The electrical-optical converting unit 160 converts an electrical signal of a downlink frame Fd input from the frame processing unit 15 into an optical signal, and outputs the optical signal to the optical multiplexer/demultiplexer 17.

The frame processing unit 15 is an example of the relay processing circuitry, and relays communications between the RNC 5 and the small base stations 3. More specifically, the frame processing unit 15 processes a downlink frame Fd input from the transmitter/receiver 14, and outputs the processed downlink frame Fd to the electrical-optical converting unit 160. The frame processing unit 15 processes an uplink frame Fu input from the optical-electrical converting unit 161, and outputs the processed uplink frame Fu to the transmitter/receiver 14. It should be noted that the frame processing unit 15 is formed with a logical circuit, such as a field programmable gate array (FPGA) or an application specified integrated circuit (ASIC).

The frame processing unit 15 receives an uplink frame Fu by detecting the synchronization pattern of the overhead OH attached to the uplink frame Fu. In accordance with the LLID attached to the uplink frame Fu, the frame processing unit 15 determines the transmission source ONU 2, and deletes the LLID from the uplink frame Fu. The frame processing unit 15 outputs the user frame of the uplink frame Fu to the transmitter/receiver 14, acquires the response message from the control frame, and outputs the response message to the CPU 10 via the HW-IF 18.

The frame processing unit 15 also attaches the LLID corresponding to the logical link between the OLT 1 and the transmission destination ONU 2, to a downlink frame Fu, and outputs the downlink frame Fu to the electrical-optical converting unit 160. The LLIDs for the respective logical links are set in the frame processing unit 15 from the CPU 10 via the HW-IF 18.

A control message is also input to the frame processing unit 15 from the CPU 10 via the HW-IF 18. The frame processing unit 15 generates a control frame containing the control message, and outputs the control frame to the electrical-optical converting unit 160.

The frame processing unit 15 time-division multiplexes a control frame signal on the user frame signals to be transmitted to the respective ONUs 2, and then transmits the control frame signal. Because of this, the OLT 1 can be formed at lower costs than in a case where a control frame signal is superimposed on user frame signals (this case will be described later).

The transmitter/receiver 14 transmits and receives data signals to and from the RNC 5, and inputs and outputs user frames to and from the frame processing unit 15. The format of the data signals may be an asynchronous transfer mode (ATM) cell, for example, but is not necessarily an ATM cell.

The transmitter/receiver 14 receives a data signal from the RNC 5, converts the data signal into a user frame, and outputs the user frame to the frame processing unit 15. The transmitter/receiver 14 also converts a user frame input from the frame processing unit 15 into a data signal, and transmits the data signal to the RNC 5. It should be noted that the transmitter/receiver 14 is formed with a circuit such as an ASIC or an FPGA.

The ROM 11 stores the program for driving the CPU 10. The RAM 12 functions as a working memory of the CPU 10. The HW-IF 18 connects the frame processing unit 15 to the bus 19, to relay communications between the CPU 10 and the frame processing unit 15 (see the arrow with a dashed line). It should be noted that the HW-IF 18 is formed with a logical circuit, such as an FPGA or an ASIC.

The SRAM 13 stores a base station management table 130 and frame data 131. The correspondence relationship between the ONUs 2 and the small base stations 3 connected to the ONUs 2 is registered in the base station management table 130. In accordance with the base station management table 130, the CPU 10 determines which ONU 2 is to be subjected to sleep control. It should be noted that the base station management table 130 is registered from a network surveillance control device, for example.

Meanwhile, the frame data 131 is the data of user frames that have been input from the transmitter/receiver 14 to the frame processing unit 15. The frame data 131 is acquired from the frame processing unit 15 by the CPU 10, and is used to detect a sleep control instruction issued from the RNC 5 to the small base station 3.

When the CPU 10 reads the program from the ROM 11, an operation control unit 100, a link control unit 101, a frame acquiring unit 102, an instruction detecting unit 103, and a sleep control unit 104 are formed as functions. The operation control unit 100 controls the entire operation of the OLT 1, and, in accordance with a predetermined sequence, issues operation instructions to the link control unit 101, the frame acquiring unit 102, the instruction detecting unit 103, and the sleep control unit 104. The operation control unit 100, the link control unit 101, the frame acquiring unit 102, the instruction detecting unit 103, and the sleep control unit 104 may be formed with logical circuits, such as FPGAs or ASICs.

The link control unit 101 establishes logical links between the OLT 1 and the ONUs 2, and assigns an LLID to each logical link. At this stage, the link control unit 101 transmits and receives control messages to and from the ONUs 2. The link control unit 101 sets the LLIDs in the frame processing unit 15.

The frame acquiring unit 102 acquires user frames input from the transmitter/receiver 14 to the frame processing unit 15, from the frame processing unit 15 via the HW-IF 18. The frame acquiring unit 102 stores the frame data 131 of the user frames into the SRAM 13.

The instruction detecting unit 103 is an example of the detecting circuitry. From a communication being relayed by the frame processing unit 15, the instruction detecting unit 103 detects a sleep control instruction issued from the RNC 5 to the small base station 3. More specifically, the instruction detecting unit 103 detects a sleep control instruction, which is a sleep instruction signal or a sleep end instruction signal, in accordance with a predetermined identifier from the frame data 131 in the SRAM 13. The instruction detecting unit 103 notifies the operation control unit 100 of the detection result. In accordance with the detection result, the operation control unit 100 instructs the sleep control unit 104 to operate.

The sleep control unit 104 is an example of the control circuitry. In response to detection of a sleep control instruction, the sleep control unit 104 controls the ONU 2 connected to the small base station 3 to shift to the operating state or the sleep state, via the optical fiber 9. More specifically, the sleep control unit 104 controls the state of the ONU 2 in accordance with an instruction from the operation control unit 100.

In a case where a sleep instruction signal or a sleep end instruction signal is detected from the frame data 131 by the instruction detecting unit 103, the sleep control unit 104 searches the base station management table 130 for the ONU 2 corresponding to the instruction target small base station 3. In a case where a sleep instruction signal is detected, the sleep control unit 104 generates a sleep control signal addressed to the ONU 2, and outputs the sleep control signal as a control message to the frame processing unit 15.

In a case where a sleep end instruction signal is detected, the sleep control unit 104 generates a sleep end control signal addressed to the ONU 2, and outputs the sleep end control signal as a control message to the frame processing unit 15. The frame processing unit 15 generates a control frame containing the control message input from the sleep control unit 104, attaches the corresponding LLID to the control frame, and transmits the control frame to the ONU 2.

After the detection process by the instruction detecting unit 103 is completed, the operation control unit 100 outputs the frame data 131 in the SRAM 13 to the frame processing unit 15 via the HW-IF 18. As a result, the user frame is output from the frame processing unit 15 to the electrical-optical converting unit 160.

In a case where a sleep instruction signal is detected, after the operation control unit 100 outputs the frame data 131 to the frame processing unit 15, the sleep control unit 104 outputs a sleep control signal to the frame processing unit 15. Thus, the ONU 2 can perform sleep setting on the UNI 2*b* after transmitting the sleep instruction signal to the small base station 3.

In a case where a sleep end instruction signal is detected, the sleep control unit 104 outputs a sleep control signal to the frame processing unit 15 before the operation control unit 100 outputs the frame data 131 to the frame processing unit 15. Thus, the ONU 2 can cancel the sleep setting of the UNI 2*b* before transmitting the sleep end instruction signal to the small base station 3.

Figure 6:
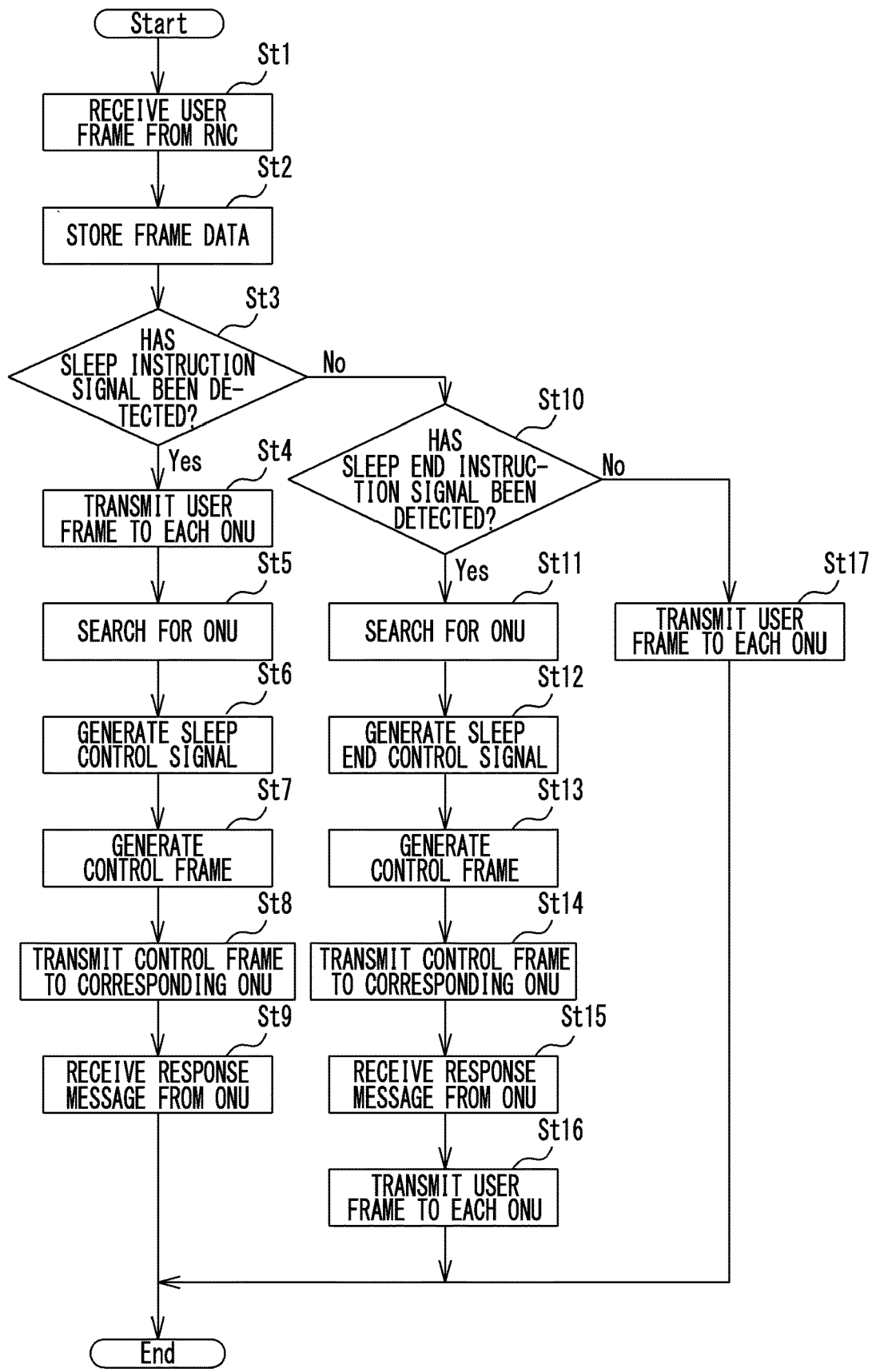
FIG. 6 is a flowchart showing an example operation of an OLT.

FIG. 6 is a flowchart showing an example operation of the OLT 1. This flowchart shows an example process of transmitting a downlink frame Fd to the ONU 2.

The frame processing unit 15 receives a user frame from the RNC 5 (step SU). The frame acquiring unit 102 then acquires the frame data 131 of the user frame from the frame processing unit 15, and stores the frame data 131 into the SRAM 13 (step St2).

The operation control unit 100 determines whether the instruction detecting unit 103 has detected a sleep instruction signal from the frame data 131 (step St3). If the instruction detecting unit 103 has detected a sleep instruction signal (Yes in step St3), the frame processing unit 15 transmits the user frame to each ONU 2, as the frame data 131 is input from the operation control unit 100 to the frame processing unit 15 (step St4).

In accordance with an instruction from the operation control unit 100, the sleep control unit 104 searches the base station management table 130 for the ONU 2 corresponding to the small base station 3 to which the sleep instruction signal is addressed (step St5). The sleep control unit 104 then generates a sleep control signal addressed to the ONU 2 (step St6). The sleep control signal is input from the sleep control unit 104 to the frame processing unit 15.

The frame processing unit 15 generates a control frame containing the sleep control signal as a control message (step St7). The frame processing unit 15 then attaches the LLID corresponding to the logical link of the detected ONU 2, to the control frame, and transmits the control frame to the ONU 2 (step St8). In doing so, the frame processing unit 15 time-division multiplexes the signal of the control frame on the signal of the user frame, and then transmits the control frame. Thus, the costs for the OLT 1 become lower than those in a case where signals are superimposed on each other (this case will be described later).

The frame processing unit 15 then receives a response message in response to the sleep control signal from the ONU 2 (step St9), and the process then comes to an end.

If the instruction detecting unit 103 has not detected any sleep instruction signal (No in step St3), the operation control unit 100 determines whether the instruction detecting unit 103 has detected a sleep end instruction signal from the frame data 131 (step St10).

If the instruction detecting unit 103 has detected a sleep end instruction signal (Yes in step St10), the sleep control unit 104 searches the base station management table 130 for the ONU 2 corresponding to the small base station 3 to which the sleep end instruction signal is addressed, in accordance with an instruction from the operation control unit 100 (step St11). The sleep control unit 104 then generates a sleep end control signal addressed to the ONU 2 (step St12). The sleep end control signal is input from the sleep control unit 104 to the frame processing unit 15.

The frame processing unit 15 generates a control frame containing the sleep end control signal as a control message (step St13). The frame processing unit 15 then attaches the LLID corresponding to the logical link of the detected ONU 2 to the control frame, and transmits the control frame to the ONU 2 (step St14). In doing so, the frame processing unit 15 time-division multiplexes the signal of the control frame on the signal of the user frame, and then transmits the control frame.

The frame processing unit 15 then receives a response message in response to the sleep control signal from the ONU 2 (step St 15). As the frame data 131 is input from the operation control unit 100, the frame processing unit 15 transmits the user frame to each ONU 2 (step St16), and the process then comes to an end.

If the instruction detecting unit 103 has not detected any sleep end instruction signal (No in step St10), on the other hand, the frame processing unit 15 transmits the user frame to each ONU 2, as the frame data 131 is input from the operation control unit 100 (step St17). The process then comes to an end. In this manner, the OLT 1 operates.

As described above, the frame processing unit 15 relays communications between the small base stations 3 and the RNC 5, which controls the small base stations 3 in accordance with the terminal information acquired from the large base station 4. From a communication being relayed, the instruction detecting unit 103 detects a sleep control instruction issued from the RNC 5 to the small base station 3. In response to detection of the sleep control instruction, the sleep control unit 104 controls the ONU 2 connected to the instruction target small base station 3 to shift to the operating state or the sleep state, via the optical fiber 9.

As the RNC 5 controls the small base stations 3 in accordance with the terminal information acquired from the large base station 4, the state of the small base station 3 connected to the ONU 2 in the sleep state can be detected from the terminal information. Since the RNC 5 detects the state of the small base station 3, the OLT does not need to control the ONU 2 to shift to the operating state, unlike an OLT in Patent Document 3 described above.

Also, in response to detection of a sleep control instruction issued from the RNC 5 to the small base station 3, the OLT 1 controls the ONU 2 to shift to the operating state or the sleep state, via the optical fiber 9. As the OLT 1 performs sleep control on the ONU 2 via the PON-IF 2*a*, the temporal restriction in a case where the UNI 2*b* is put into the sleep state is reduced. Thus, the OLT 1 can improve the power saving performance of the network.

Further, in response to detection of a sleep control instruction, the sleep control unit 104 generates a control signal for controlling the state of the ONU 2 connected to the instruction destination small base station 3, and the frame processing unit 15 time-division multiplexes a sleep control signal or a sleep end control signal on the signal to be transmitted to each ONU 2, and then transmits the resultant signal. Thus, the costs for the OLT 1 become smaller than those in a case where signals are superimposed on each other.

Figure 7:
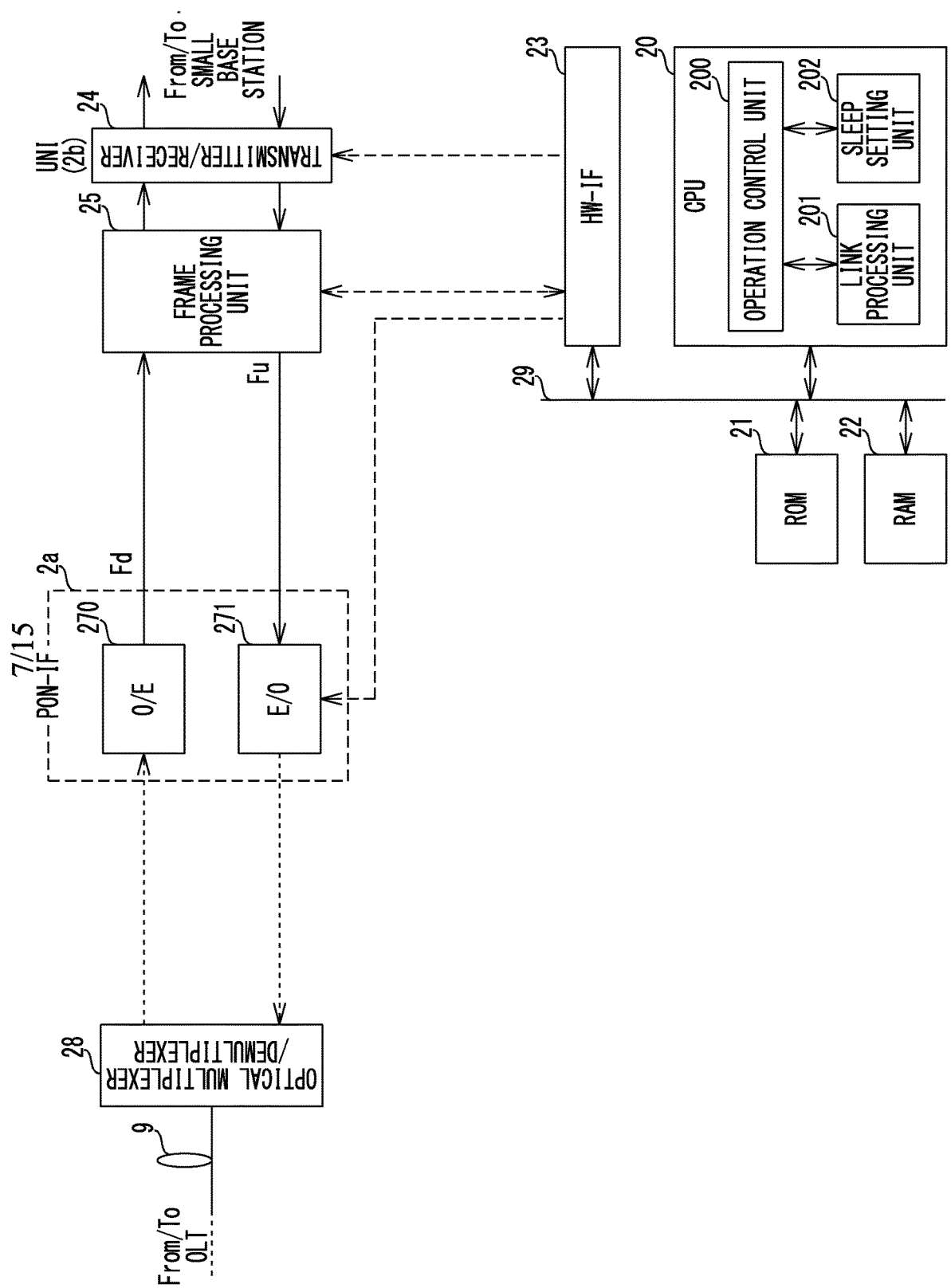
FIG. 7 is a configuration diagram showing an example of an ONU.

FIG. 7 is a configuration diagram showing an example of the ONU 2. The ONU 2 includes a CPU 20, a ROM 21, a RAM 22, and a hardware interface unit (HW-IF) 23. The CPU 20 is connected to the ROM 21, the RAM 22, and the HW-IF 23 via a bus 29, so that signals can be input and output to and from one another. Instead of the CPU 20, some other processor such as an MPU may be used.

The ONU 2 also includes an optical multiplexer/demultiplexer 28, an optical-electrical converting unit (O/E) 270, an electrical-optical converting unit (E/O) 271, a frame processing unit 25, and a transmitter/receiver 24. The optical-electrical converting unit 270 and the electrical-optical converting unit 271 correspond to the PON-IF 2a, and the transmitter/receiver 24 corresponds to the UNI 2b.

The optical multiplexer/demultiplexer 28 is a WDM coupler, for example. The optical multiplexer/demultiplexer 28 guides an optical signal input from the OLT 1 via the optical fiber 9 to the optical-electrical converting unit 270, and guides an optical signal input from the electrical-optical converting unit 271 to the optical fiber 9. The arrows with dotted lines between the optical multiplexer/demultiplexer 28, and the optical-electrical converting unit 270 and the electrical-optical converting unit 271 indicate the output directions of optical signals.

The optical-electrical converting unit 270 is formed with a circuit such as a photodiode. The optical-electrical converting unit 270 converts an optical signal input from the OLT 1 into an electrical signal, and outputs the electrical signal to the frame processing unit 25. The electrical signal includes a downlink frame Fd. The electrical-optical converting unit 271 is formed with a circuit including a laser diode or the like. The electrical-optical converting unit 271 converts an electrical signal contained in an uplink frame Fu input from the frame processing unit 25 into an optical signal, and outputs the optical signal to the optical multiplexer/demultiplexer 28.

In this manner, the optical-electrical converting unit 270 and the electrical-optical converting unit 271 function as the PON-IF 2a that communicates with the OLT 1 via the optical fiber 9.

The frame processing unit 25 detects the LLID of the downlink frame Fd input from the optical-electrical converting unit 270, and receives the downlink frame Fd in accordance with the LLID. The frame processing unit 25 receives the downlink frame Fd to which the LLID of the logical link between the ONU 2 and the OLT 1 is attached, and discards the downlink frames Fd to which other LLIDs are attached.

The frame processing unit 25 outputs the user frame in the downlink frame Fd to the transmitter/receiver 24. The frame processing unit 25 acquires a control message from the control frame, and outputs the control message to the CPU 20 via the HW-IF 23.

The frame processing unit 25 also attaches the LLID corresponding to the logical link between the ONU 2 and the OLT 1 to an uplink frame Fu, and outputs the uplink frame Fu to the electrical-optical converting unit 271. The uplink frame Fu is output at the time designated by the OLT 1. The LLIDs for the respective logical links are set in the frame processing unit 25 by the CPU 20 via the HW-IF 23.

Further, a response message is input from the CPU 20 to the frame processing unit 25 via the HW-IF 23. The frame processing unit 25 generates a control frame containing the response message, and outputs the control frame to the electrical-optical converting unit 271.

The frame processing unit 25 time-division multiplexes the signal of the control frame on the signal of the user frame to be transmitted to each OLT 1. Accordingly, the ONU 2 is formed at lower costs than those in a case where a control frame signal is superimposed on a user frame signal (this case will be described later).

The transmitter/receiver 24 transmits and receives data signals to and from the small base station 3, and inputs and outputs user frames to and from the frame processing unit 25. The data signal format may be an Ethernet frame, for example, but is not necessarily an Ethernet frame.

The transmitter/receiver 24 receives a data signal from the small base station 3, converts the data signal into a user frame, and outputs the user frame to the frame processing unit 25. The transmitter/receiver 24 also converts a user frame input from the frame processing unit 25 into a data signal, and transmits the data signal to the small base station 3.

In this manner, the transmitter/receiver 24 functions as the UNI 2b that communicates with the small base station 3. It should be noted that the transmitter/receiver 24 is formed with a circuit such as an ASIC or an FPGA.

The frame processing unit 25 is an example of the transfer processing circuitry, and transfers a sleep instruction signal and a sleep end instruction signal issued from the RNC 5 to the small base station 3, from the optical-electrical converting unit 270 to the transmitter/receiver 24. Thus, the small base station 3 shifts to the operating state or the sleep state, in accordance with a sleep control instruction issued from the RNC 5.

The ROM 21 stores the program for driving the CPU 20. The RAM 22 functions as a working memory of the CPU 20. The HW-IF 23 connects the frame processing unit 25, the electrical-optical converting unit 271, and the transmitter/receiver 24 to the bus 29, to relay communications between the CPU 20 and the frame processing unit 25, the electrical-optical converting unit 271, and the transmitter/receiver 24 (see arrows with dotted lines). It should be noted that the HW-IF 23 is formed with a logical circuit such as an FPGA or an ASIC.

When the CPU 20 reads the program from the ROM 21, an operation control unit 200, a link processing unit 201, and a sleep setting unit 202 are formed as functions. The operation control unit 200 controls the entire operation of the ONU 2, and, in accordance with a predetermined sequence, issues operation instructions to the link processing unit 201 and the sleep setting unit 202. The operation control unit 200, the link processing unit 201, and the sleep setting unit 202 may be formed with logical circuits, such as FPGAs or ASICs.

The link processing unit 201 establishes a logical link between the OLT 1 and the ONU, and assigns an LLID to each logical link. At this stage, the link processing unit 201 transmits and receives a control message to and from the OLT 1. The link processing unit 201 sets the LLID in the frame processing unit 25.

The sleep setting unit 202 is an example of the setting processing circuitry, and, under the control of the OLT 1, puts the UNI 2b into the operating state or the sleep state. More specifically, the sleep setting unit 202 receives a control message from the frame processing unit 25 via the HW-IF 23, and, in accordance with the control message, sets the states of the electrical-optical converting unit 271 and the transmitter/receiver 24.

In a case where the control message is a sleep control signal, the sleep setting unit 202 puts the electrical-optical converting unit 271 and the transmitter/receiver 24 into the sleep state. In the sleep state, the transmitter/receiver 24 performs no data signal transmission/reception to and from the small base station 3, to reduce power consumption. In the sleep state, the electrical-optical converting unit 271 performs control to turn off output light from an LD, for example, to reduce power consumption.

In a case where the control message is a sleep end control signal, the sleep setting unit 202 puts the electrical-optical converting unit 271 and the transmitter/receiver 24 into the operating state. The transmitter/receiver 24 in the operating state performs data signal transmission/reception to and from the small base station 3, and the electrical-optical converting unit 271 in the operating state performs control to turn on output light from an LD, for example.

In this manner, the sleep setting unit 202 causes the electrical-optical converting unit 271 and the transmitter/receiver 24 to shift to the operating state or the sleep state, under the control of the OLT 1.

Figure 8:
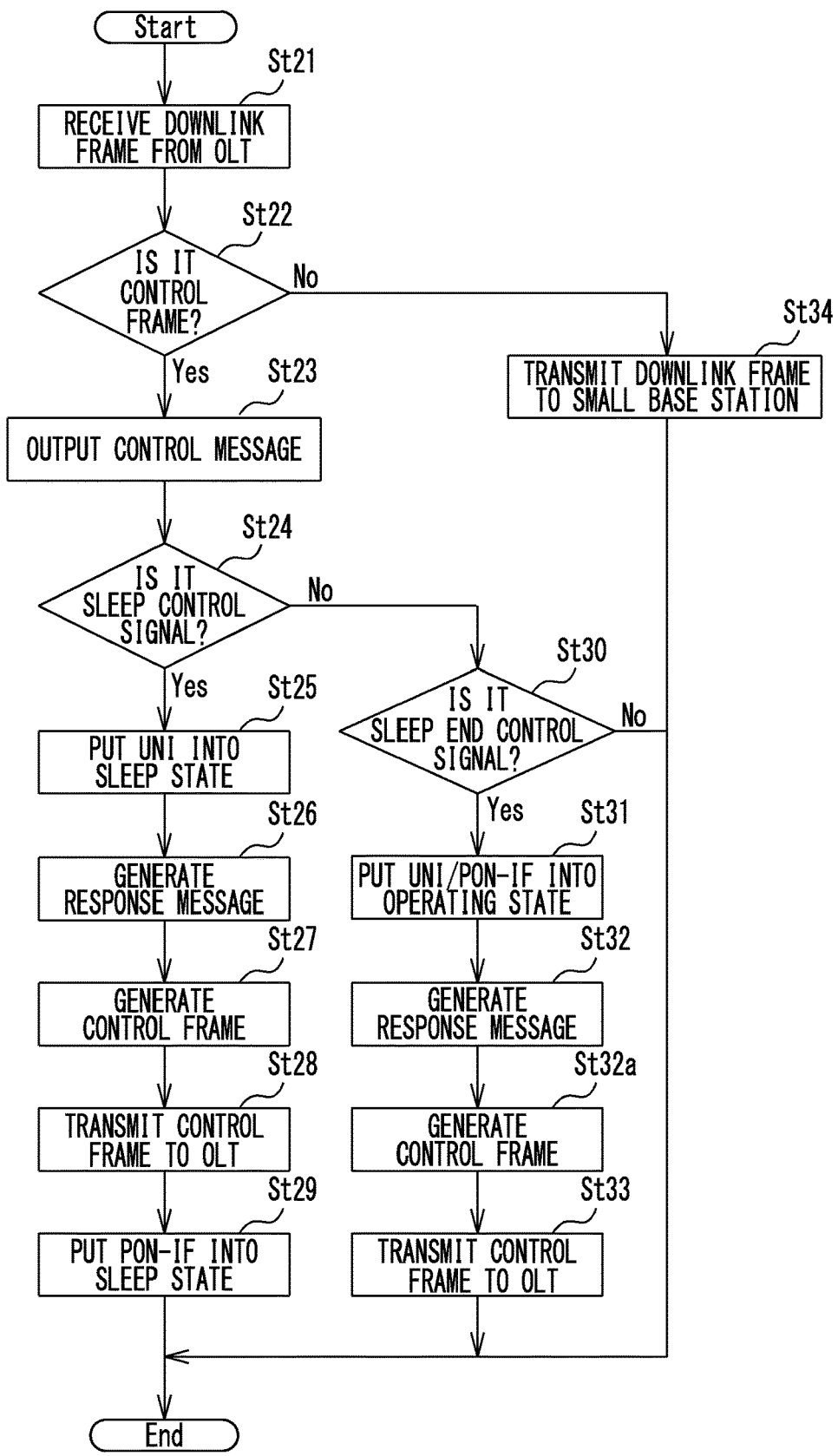
FIG. 8 is a flowchart showing an example operation of an ONU.

FIG. 8 is a flowchart showing an example operation of the ONU 2. This flowchart shows an example process of setting the state of the ONU 2 in accordance with a received downlink frame Rd.

The frame processing unit 25 receives a downlink frame Fd from the OLT 1 (step St21). The frame processing unit 25 determines whether the downlink frame Fd is a control frame (step St22). If the downlink frame Fd is a user frame (No in step St22), the frame processing unit 25 outputs the downlink frame Fd to the transmitter/receiver 24, to transmit the downlink frame Fd to the small base station 3 (step S34). The process then comes to an end.

If the downlink frame Fd is a control frame (Yes in step St22), the frame processing unit 25 acquires a control message from the control frame, and outputs the control message to the sleep setting unit 202 via the HW-IF 23 (step St23). It should be noted that the frame processing unit 25 identifies the control frame from the DA of the downlink frame Fd, for example.

The sleep setting unit 202 then determines whether the control message is a sleep control signal (step St24). If the control message is a sleep control signal (Yes in step St24), the sleep setting unit 202 puts the UNI 2b, or the transmitter/receiver 24, into the sleep state (step St25).

The sleep setting unit 202 then generates a response message in response to the control message (step St26). The response message is output to the frame processing unit 25 via the HW-IF 23.

The frame processing unit 25 then generates a control frame containing the response message (step St27). The frame processing unit 25 then attaches the LLID corresponding to the logical link between the ONU 2 and the OLT 1, to the control frame, and transmits the control frame to the OLT 1 (step St28). When a notification of control frame transmission completion is received from the frame processing unit 25, the sleep setting unit 202 puts the PON-IF 2a, or the electrical-optical converting unit 271, into the sleep state (step St29). The process then comes to an end.

If the control message is not a sleep control signal (No in step St24), the sleep setting unit 202 determines whether the control message is a sleep end control signal (step St30). If the control message is not a sleep end control signal (No in step St30), the sleep setting unit 202 ends the process.

If the control message is a sleep end control signal (Yes in step St30), the sleep setting unit 202 puts the UNI 2b and the PON-IF 2a into the operating state (step St31). The sleep setting unit 202 generates a response message in response to the control message (step St32). The response message is output to the frame processing unit 25 via the HW-IF 23.

The frame processing unit 25 generates a control frame containing the response message (step St32a). The frame processing unit 25 then attaches the LLID corresponding to the logical link between the ONU 2 and the OLT 1 to the control frame, and transmits the control frame to the OLT 1 (step S33). The process then comes to an end.

The ONU 2 operates in the above manner.

As described above, the UNI 2b communicates with the small base station 3, and the PON-IF 2a communicates, via the optical fiber 9, with the OLT 1 connected to the RNC 5, which controls the small base station 3 in accordance with terminal information acquired from the large base station 4. The frame processing unit 25 transfers a sleep control instruction issued from the RNCS to the small base station 3, from the PON-IF 2a to the UNI 2b. Under the control of the OLT 1, the sleep setting unit 202 puts the UNI 2b into the operating state or the sleep state.

The RNC 5 controls the small base stations 3 in accordance with terminal information acquired from the large base station 4. Accordingly, even if the UNI 2b of the ONU 2 is in the sleep state, the state of the small base station 3 connected to the ONU 2 can be detected from the terminal information. Thus, to enable the RNC 5 to detect the state of the small base station 3, the ONU 2 does not need to put the UNI 2b into the operating state, unlike an ONU in Patent Document 3 described above.

Further, the ONU 2 transfers a sleep control instruction from the PON-IF 2a to the UNI 2b, and, under the control of the OLT 1, puts the UNI 2b into the operating state or the sleep state.

As sleep control is performed on the ONU 2 by the OLT 1 through the PON-IF 2a, the temporal restriction in a case where the UNI 2b is put into the sleep state is reduced, unlike the temporal restriction in Patent Document 2 described above. Thus, by the above described communication control method, it is possible to improve the power saving performance of the network.

In the above described embodiment, the OLT 1 time-division multiplexes a sleep control signal or a sleep end control signal on a user frame signal, and then transmits the resultant signal. However, a sleep control signal or a sleep end control signal (either of the signals will be hereinafter referred to as a "sleep signal") may be superimposed on a user frame signal by wavelength multiplexing or frequency multiplexing. In this case, the sleep signal does not occupy the band of the user frame signal. Accordingly, the throughput of the user frames in the PON becomes higher than that in the case of the above described time-division multiplexing. Further, the speed of the sleep signal can be made lower than the speed of the user frame signal. Accordingly, the power of received light can be made lower than that in the case of the above described time-division multiplexing.

Figure 9:
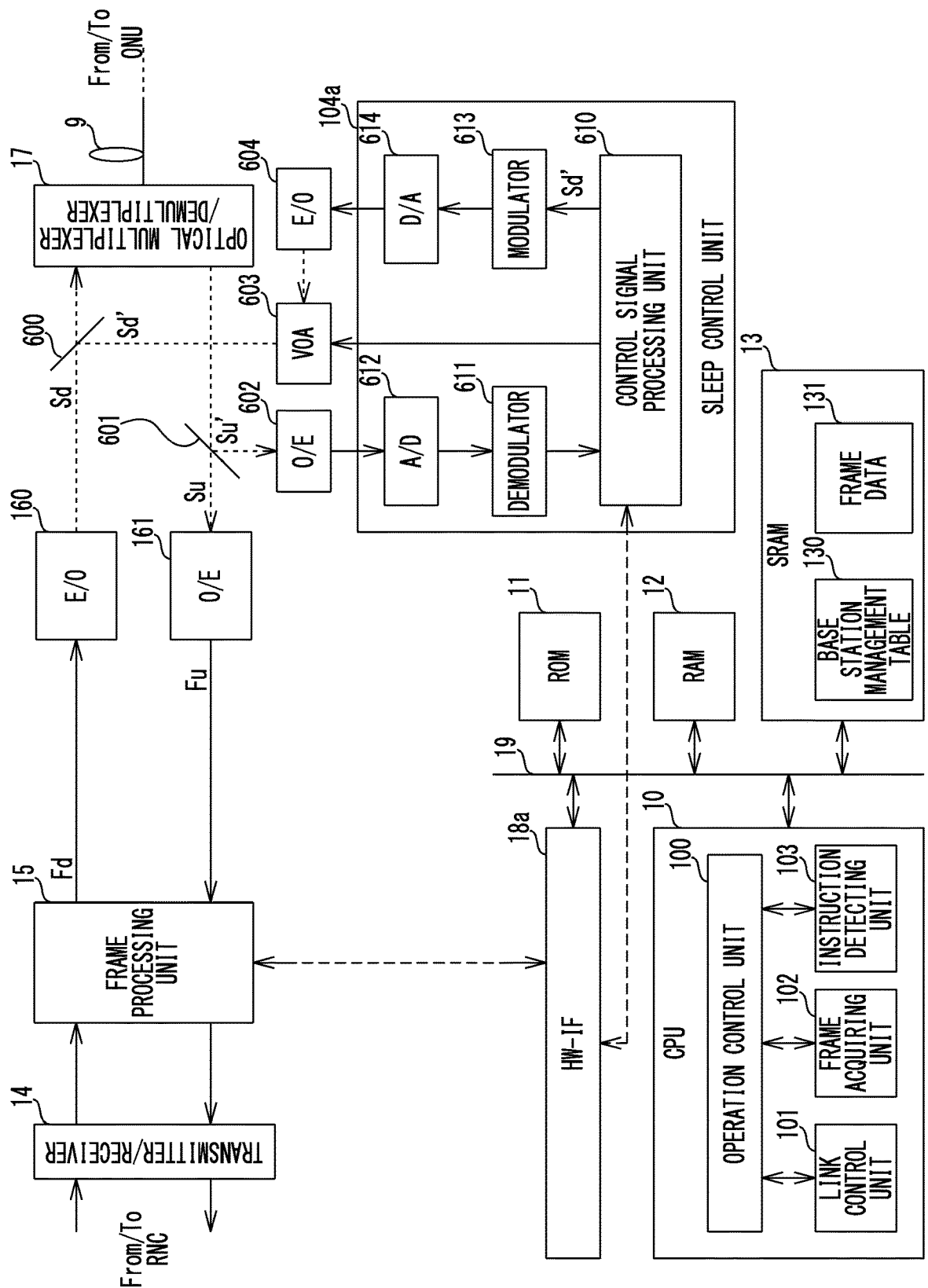
FIG. 9 is a configuration diagram showing another example of an OLT.

FIG. 9 is a configuration diagram showing another example of the OLT 1. In FIG. 9, the same components as those shown in FIG. 5 are denoted by the same reference numerals as those used in FIG. 5, and explanation of them is not repeated herein.

The OLT 1 includes the CPU 10, the ROM 11, the RAM 12, the SRAM 13, an HW-IF 18a, the transmitter/receiver 14, the frame processing unit 15, the optical multiplexer/demultiplexer 17, an electrical-optical converting unit 160, and the optical-electrical converting unit 161. The OLT 1 also includes a sleep control unit 104a, an electrical-optical converting unit 604, an optical-electrical converting unit 602, a variable optical attenuator (VOA) 603, a multiplexer 600, and a demultiplexer 601.

In this example, the sleep control unit 104a is provided, instead of the above described sleep control unit 104. The sleep control unit 104a is an example of the control circuitry. In response to detection of a sleep control instruction by the instruction detecting unit 103, the sleep control unit 104a controls the ONU 2 connected to the instruction destination small base station 3 to shift to an operating state or a sleep state, via the optical fiber 9, like the sleep control unit 104. The sleep control unit 104a is formed with a logical circuit, such as an FPGA or an ASIC.

As indicated by a dashed line, the sleep control unit 104a communicates with the CPU 10 via the HW-IF 18a. Like the sleep control unit 104, the sleep control unit 104a operates in accordance with an instruction from the operation control unit 100.

The sleep control unit 104a is also connected to transmission paths of optical signals Su and Sd via the electrical-optical converting unit 604 and the electrical-optical converting unit 602. The transmission paths of the optical signals Su and Sd are located between the optical multiplexer/demultiplexer 17, and the electrical-optical converting unit 160 and the optical-electrical converting unit 161. The multiplexer 600 is connected between the optical multiplexer/demultiplexer 17 and the electrical-optical converting unit 160, and the demultiplexer 601 is connected between the optical multiplexer/demultiplexer 17 and the optical-electrical converting unit 161. The sleep control unit 104a outputs a sleep signal to the transmission path of the optical signal Sd, and a sleep signal is input to the sleep control unit 104a from the transmission path of the optical signal Su.

The sleep control unit 104a outputs a sleep signal to the electrical-optical converting unit 604. The electrical-optical converting unit 604 is formed with a circuit that includes a laser diode or the like. The electrical-optical converting unit 604 converts the sleep signal, which is an electrical signal, into an optical signal Sd', and outputs the optical signal Sd' to the variable optical attenuator 603.

The variable optical attenuator 603 attenuates the optical signal Sd' by an attenuation amount controlled by the sleep control unit 104a, and outputs the optical signal Sd' to the multiplexer 600. The multiplexer 600 is an optical coupler, for example, and multiplexes the optical signal Sd' output from the sleep control unit 104a on the optical signal Sd output from the electrical-optical converting unit 160. As a result, the optical signal Sd' including the sleep signal is superimposed on the optical signal Sd of the downlink frame Fd. The superimposed signal of the optical signal Sd and the optical signal Sd' is output to the optical multiplexer/demultiplexer 17.

Figure 10:
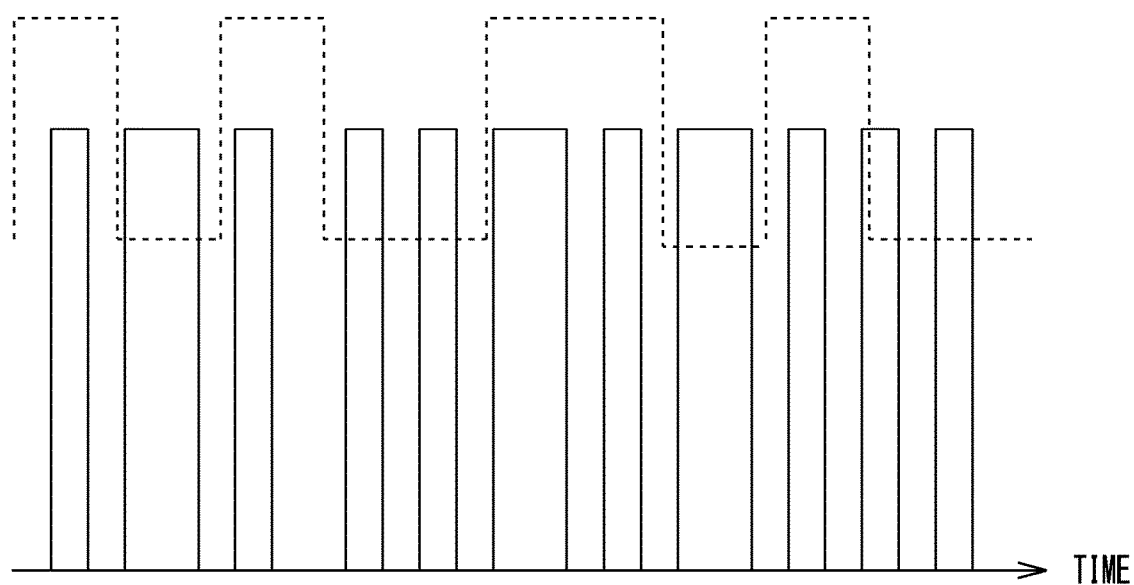
FIG. 10 is a waveform chart showing an example of a superimposed signal.

FIG. 10 is a waveform chart showing an example of the superimposed signal. In FIG. 10, the abscissa axis indicates time. The solid line indicates the waveform of the optical signal Sd, and the dotted line indicates the waveform of the optical signal Sd'. The optical signal Sd' is modulated by ASK (Amplitude Shift Keying), for example, and is transmitted at a low speed of approximately 100 kbps. The optical signal Sd' is wavelength-multiplexed on the optical signal Sd. The modulation method for the optical signal Sd' is not necessarily ASK, but may be FSK (Frequency Shift Keying) or PSK (Phase Shift Keying).

In this manner, the multiplexer 600 serves as an example of the optical coupler, and superimposes the optical signal Sd' obtained from a sleep signal on the optical signal Sd of the downlink frame Fd to be relayed by the frame processing unit 15. Thus, the optical signal Sd' does not occupy the band of the optical signal Sd of the downlink frame Fd.

Meanwhile, the demultiplexer 601 is a WDM coupler, for example, and splits light input from the optical multiplexer/demultiplexer 17 into the optical signal Su containing an uplink frame Fu and an optical signal Su' containing a response signal (a response message). The optical signal Su is input to the optical-electrical converting unit 161, and the optical signal Su' is input to the optical-electrical converting unit 602.

The optical-electrical converting unit 602 is formed with a circuit such as a photodiode. The optical-electrical converting unit 602 converts the optical signal Su' input from the demultiplexer 601 into an electrical signal, and outputs the electrical signal to the sleep control unit 104a.

The sleep control unit 104a includes a control signal processing unit 610, a demodulator 611, an analog-digital converting unit (A/D) 612, a modulator 613, and a digital-analog converting unit (D/A) 614. The control signal processing unit 610 generates a sleep signal in accordance with an instruction from the operation control unit 100, and outputs the sleep signal to the modulator 613.

The modulator 613 modulates the sleep signal, and outputs the modulated sleep signal to the digital-analog converting unit 614. The digital-analog converting unit 614 converts the sleep signal from a digital signal into an analog signal, and outputs the converted sleep signal to the electrical-optical converting unit 604.

The control signal processing unit 610 adjusts the attenuation amount of the variable optical attenuator 603 to an appropriate value. As described above, the speed of the optical signal Sd' is lower than the speed of the optical signal Sd of the downlink frame Fd. Thus, the control signal processing unit 610 can reduce the power of the optical signal Sd' to a lower power than the optical signal Sd with the variable optical attenuator 603.

The analog-digital converting unit 612 converts a response signal input from the optical-electrical converting unit 602 from an analog signal into a digital signal, and outputs the converted response signal to the demodulator 611. The demodulator 611 demodulates the response signal, and outputs the demodulated response signal to the control signal processing unit 610.

In this example, a sleep signal is optically superimposed on a signal of a downlink frame Fd. However, a sleep signal may be electrically superimposed on a signal of a downlink frame Fd.

Figure 11:
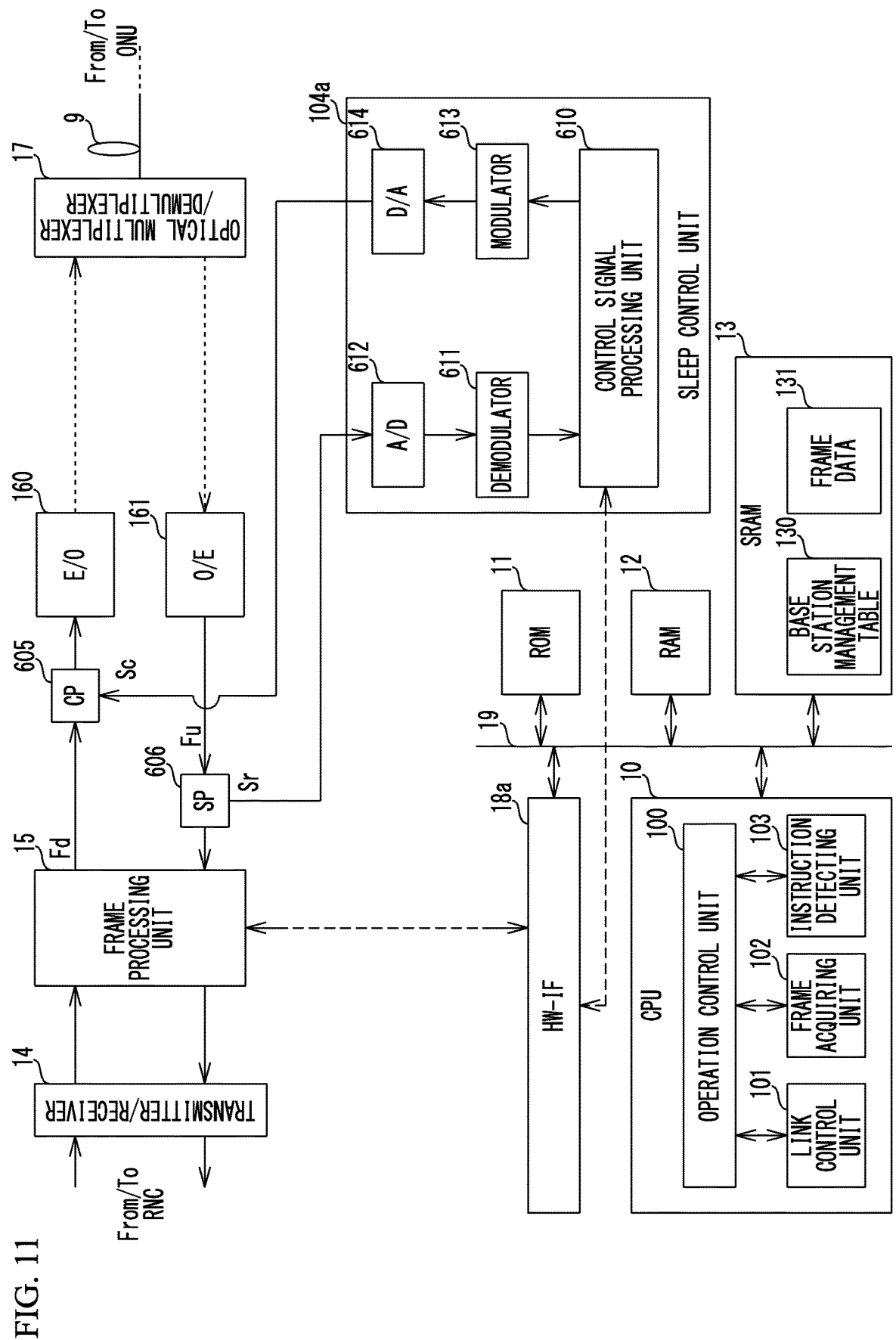
FIG. 11 is a configuration diagram showing another example of an OLT.

FIG. 11 is a configuration diagram showing another example of the OLT 1. In FIG. 11, the same components as those shown in FIG. 9 are denoted by the same reference numerals as those used in FIG. 9, and explanation thereof is not repeated herein.

The OLT 1 includes the CPU 10, the ROM 11, the RAM 12, the SRAM 13, the HW-IF 18a, the transmitter/receiver 14, the frame processing unit 15, the optical multiplexer/demultiplexer 17, an electrical-optical converting unit 160, and the optical-electrical converting unit 161. The OLT 1 also includes the sleep control unit 104a, an electrical coupler (CP) 605, and an electrical splitter (SP) 606.

The electrical coupler 605 is connected between the frame processing unit 15 and the electrical-optical converting unit 160, and the electrical splitter 606 is connected between the frame processing unit 15 and the optical-electrical converting unit 161. The electrical coupler 605 electrically superimposes a sleep signal Sc input from the sleep control unit 104a on a signal of a downlink frame Fd input from the frame processing unit 15. The superimposed signal of the sleep signal Sc and the signal of the downlink frame Fd is output to the electrical-optical converting unit 160.

Meanwhile, the electrical splitter 606 electrically splits an electrical signal input from the optical-electrical converting unit 161 into a response signal Sr and a signal of an uplink frame Fu. The response signal Sr is output to the sleep control unit 104a, and the signal of the uplink frame Fu is output to the frame processing unit 15.

In this manner, the electrical coupler 605 serves as an example of the optical coupler, and superimposes the sleep signal Sc on the signal of the downlink frame Fd to be relayed by the frame processing unit 15. Thus, the sleep signal Sc does not occupy the band of the signal of the downlink frame Fd.

Figure 12:
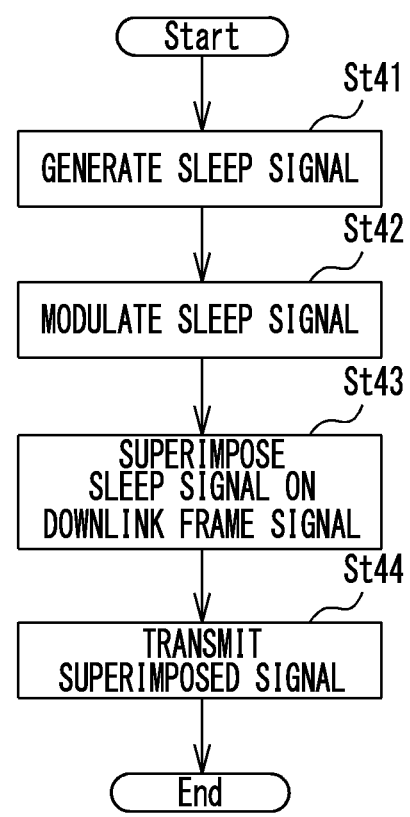
FIG. 12 is a flowchart showing an example of a superimposed signal transmission process to be performed by an OLT.

FIG. 12 is a flowchart showing an example of a superimposed signal transmission process to be performed by the OLT 1. The control signal processing unit 610 generates a sleep signal under the same conditions as those in the sleep control unit 104 (step St41). The modulator 613 then modulates the sleep signal (step St42).

The multiplexer 600 or the electrical coupler 605 superimposes the sleep signal on a signal of a downlink frame Fd (step St43). The electrical-optical converting unit 160 or 604 transmits the superimposed signal of the signal of the downlink frame Fd and the sleep signal to each ONU 2 (step St44). In this manner, the OLT 1 performs a superimposed signal transmission process.

Next, the configuration of the ONU 2 compatible with the OLT 1 of this example is described.

Figure 13:
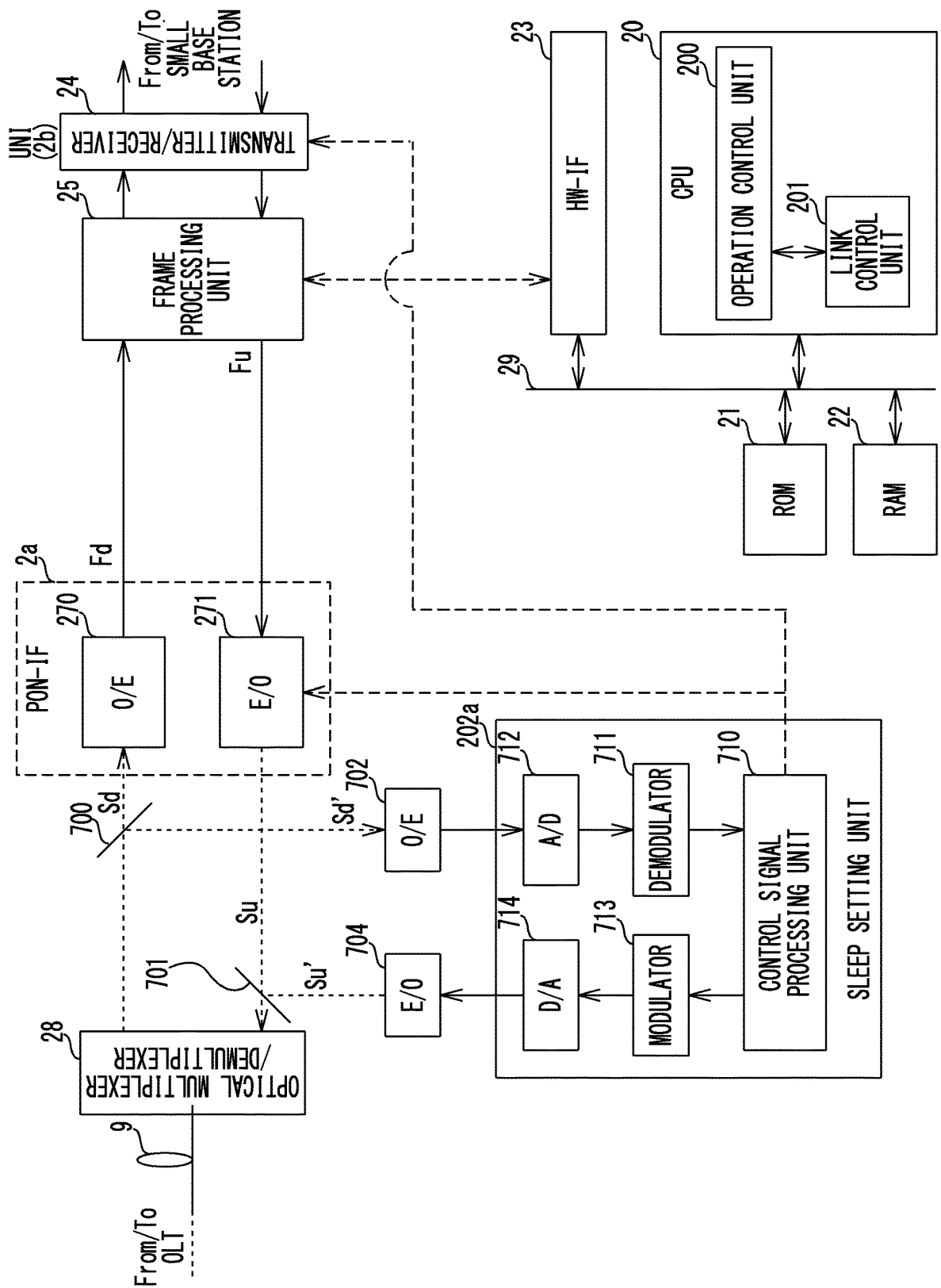
FIG. 13 is a configuration diagram showing another example of an ONU.

FIG. 13 is a configuration diagram showing another example of the ONU 2. The ONU 2 of this example is compatible with the OLT 1 shown in FIG. 9. In FIG. 13, the same components as those shown in FIG. 7 are denoted by the same reference numerals as those used in FIG. 7, and explanation thereof is not repeated herein.

The ONU 2 includes the CPU 20, the ROM 21, the RAM 22, the HW-IF 23, the optical multiplexer/demultiplexer 28, the optical-electrical converting unit 270, the electrical-optical converting unit 271, the frame processing unit 25, and the transmitter/receiver 24. The ONU 2 also includes a sleep setting unit 202a, an optical-electrical converting unit 702, an electrical-optical converting unit 704, a multiplexer 701, and a demultiplexer 700.

In this example, the sleep setting unit 202a is provided, instead of the above described sleep setting unit 202. The sleep setting unit 202a is an example of the setting processing circuitry. Like the sleep setting unit 202, the sleep setting unit 202a puts the UNI 2b into an operating state or a sleep state, under the control of the OLT 1.

The sleep setting unit 202a is also connected to the transmission paths of optical signals Su and Sd via the electrical-optical converting unit 704 and the optical-electrical converting unit 702. The transmission paths of the optical signals Su and Sd are located between the optical multiplexer/demultiplexer 28, and the electrical-optical converting unit 271 and the optical-electrical converting unit 270. The multiplexer 701 is connected between the optical multiplexer/demultiplexer 28 and the electrical-optical converting unit 271, and the demultiplexer 700 is connected between the optical multiplexer/demultiplexer 28 and the optical-electrical converting unit 270. The sleep setting unit 202a outputs a response signal (a response message) to the transmission path of the optical signal Su, and a response signal is input to the sleep setting unit 202a from the transmission path of the optical signal Sd.

The sleep setting unit 202a outputs a response signal to the electrical-optical converting unit 704. The electrical-optical converting unit 704 is formed with a circuit including a laser diode or the like. The electrical-optical converting unit 704 converts the response signal that is an electrical signal into an optical signal Su', and outputs the optical signal Su' to the multiplexer 701.

The multiplexer 701 is an optical coupler, for example, and multiplexes an optical signal Su' output from the sleep setting unit 202a on the optical signal Su output from the electrical-optical converting unit 271. As a result, the optical signal Su' containing the response signal is superimposed on the optical signal Su of an uplink frame Fu. The superimposed signal of the optical signal Su and the optical signal Su' is output to the optical multiplexer/demultiplexer 28.

Meanwhile, the demultiplexer 700 is a WDM coupler, for example, and splits light input from the optical multiplexer/demultiplexer 28 into the optical signal Sd including a downlink frame Fd and an optical signal Sd' including a sleep signal. That is, the demultiplexer 700 is an example of the separating circuitry, and separates a sleep signal from a signal the PON-IF 2a has received from the OLT 1 and on which the sleep signal has been superimposed. It should be noted that the sleep signal is an example of the setting signal. The optical signal Sd is input to the optical-electrical converting unit 270, and the optical signal Sd' is input to the optical-electrical converting unit 702.

The optical-electrical converting unit 702 is formed with a circuit such as a photodiode. The optical-electrical converting unit 702 converts the optical signal Sd' input from the demultiplexer 700 into an electrical signal, and outputs the electrical signal to the sleep setting unit 202a. Thus, the sleep signal is input to the sleep setting unit 202a.

The sleep setting unit 202a includes a control signal processing unit 710, a demodulator 711, an analog-digital converting unit (A/D) 712, a modulator 713, and a digital-analog converting unit (D/A) 714. The control signal processing unit 710 puts the transmitter/receiver 24 into the sleep state in accordance with the sleep signal, and generates a response signal. The sleep setting unit 202a outputs the response signal to the modulator 713.

The modulator 713 modulates the response signal, and outputs the response signal to the digital-analog converting unit 714. The digital-analog converting unit 714 converts the response signal from a digital signal into an analog signal, and outputs the response signal to the electrical-optical converting unit 704.

The analog-digital converting unit 712 converts the sleep signal input from the optical-electrical converting unit 702 from an analog signal into a digital signal, and outputs the sleep signal to the demodulator 711. The demodulator 711 demodulates the sleep signal, and outputs the sleep signal to the sleep setting unit 202a.

Having the above configuration, the ONU 2 optically acquires a sleep signal from a superimposed signal received from the OLT 1. The ONU 2 also optically superimposes a response signal on a signal of an uplink frame Fu, and transmits the superimposed signal to the OLT 1.

Figure 14:
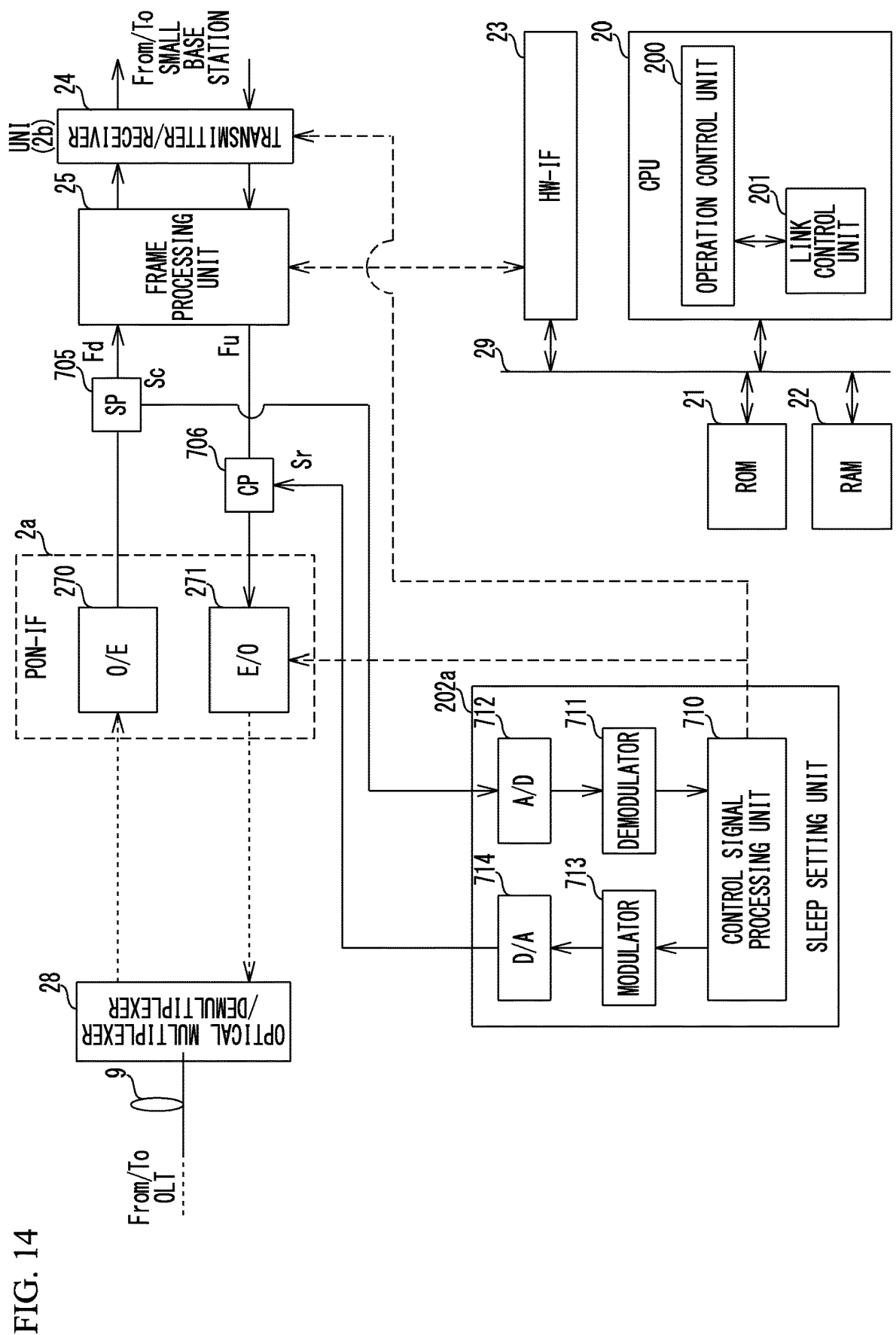
FIG. 14 is a configuration diagram showing another example of an ONU.

FIG. 14 is a configuration diagram showing another example of the ONU 2. The ONU 2 of this example is compatible with the OLT 1 shown in FIG. 11. In FIG. 14, the same components as those shown in FIG. 13 are denoted by the same reference numerals as those used in FIG. 13, and explanation thereof is not repeated herein.

The ONU 2 includes the CPU 20, the ROM 21, the RAM 22, the HW-IF 23, the optical multiplexer/demultiplexer 28, the optical-electrical converting unit 270, the electrical-optical converting unit 271, the frame processing unit 25, and the transmitter/receiver 24. The ONU 2 also includes the sleep setting unit 202a, an electrical coupler (CP) 706, and an electrical splitter (SP) 705.

The electrical coupler 706 is connected between the frame processing unit 25 and the electrical-optical converting unit 271, and the electrical splitter 705 is connected between the frame processing unit 25 and the optical-electrical converting unit 270. The electrical coupler 706 electrically superimposes a response signal Sr input from the sleep setting unit 202a on a signal of an uplink frame Fu input from the frame processing unit 25. The superimposed signal of the response signal Sr and the signal of the uplink frame Fu is output to the electrical-optical converting unit 271.

Meanwhile, the electrical splitter 705 electrically splits an electrical signal input from the optical-electrical converting unit 270 into a sleep signal Sc and a signal of a downlink frame Fd. That is, the electrical splitter 705 is an example of the separating circuitry, and separates the sleep signal Sc from a signal the PON-IF 2a has received from the OLT 1 and on which the sleep signal Sc has been superimposed. The sleep signal Sc is output to the sleep setting unit 202a, and the signal of the downlink frame Fd is output to the frame processing unit 25.

Having the above configuration, the ONU 2 electrically acquires a sleep signal from a superimposed signal received from the OLT 1. The ONU 2 also electrically superimposes a response signal on a signal of an uplink frame Fu, and transmits the superimposed signal to the OLT 1.

Figure 15:
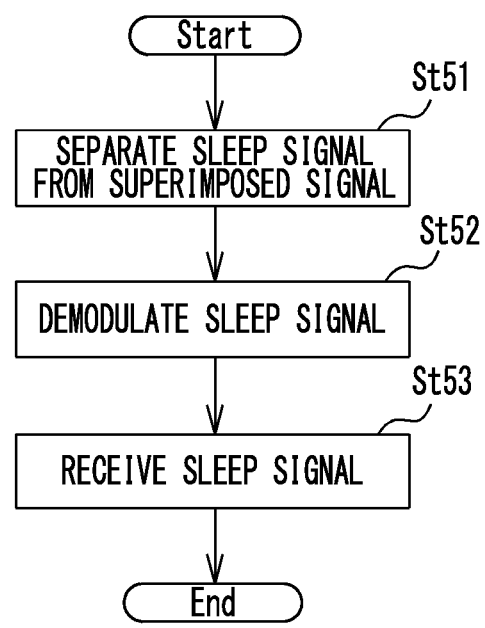
FIG. 15 is a flowchart showing an example of a superimposed signal reception process to be performed by an ONU.

FIG. 15 is a flowchart showing an example of a superimposed signal reception process to be performed by the ONU 2. The demultiplexer 700 or the electrical splitter 705 separates a sleep signal from a superimposed signal input from the OLT 1 via the optical fiber 9 (step St51). The demodulator 711 demodulates the sleep signal (step St52).

The control signal processing unit 710 then receives the sleep signal (step St53). In this manner, the ONU 2 performs a superimposed signal reception process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical terminal device comprising:
    a relay processing circuitry that relays communication between a plurality of first base stations and a control device, the plurality of first base stations being respectively connected to a plurality of optical terminating devices at branch destinations of a transmission path, the control device controlling each of the plurality of first base stations in accordance with information acquired from a second base station via another transmission path, the second base station covering a cell overlapping respective cells of the plurality of first base stations, the information being related to terminals within the respective cells of the plurality of first base stations, the terminals communicating with the plurality of first base stations;
    a detecting circuitry that detects a sleep control instruction from the communication being relayed by the relay processing circuitry, the sleep control instruction being issued for one of the first base stations from the control device;
    a memory that stores a table indicating a correspondence relationship between the plurality of first base stations and the plurality of optical terminating devices connected to the plurality of first base stations, respectively; and
    a control circuitry that searches the table for one of the plurality of optical terminating devices connected to the one of the first base stations in response to detection of the sleep control instruction, and performs control, via the transmission path, to cause the one of the plurality of optical terminating devices to shift to one of an operating state and a sleep state, the sleep state consuming less power than the operating state.

2. The optical terminal device according to claim 1, wherein,
    in response to detection of the sleep control instruction, the control circuitry generates a control signal for controlling a state of the optical terminating device connected to the one of the first base stations among the optical terminating devices, and
    the relay processing circuitry time-division multiplexes the control signal on a signal to be transmitted to the optical terminating devices among signals in the communication being relayed, and transmits a resultant signal.

3. The optical terminal device according to claim 1, further comprising
    an optical coupler that superimposes another signal on a signal in the communication being relayed by the relay processing circuitry, wherein,
    in response to detection of the sleep control instruction, the control circuitry generates a control signal for controlling a state of the optical terminating device connected to the one of the first base stations among the optical terminating devices, and
    the optical coupler superimposes the control signal on a signal to be transmitted to the optical terminating devices among signals in the communication being relayed.

4. An optical terminating device comprising:
    a first communication processing circuitry that communicates with a first base station;
    a second communication processing circuitry that communicates with an optical terminal device via a branched transmission path of the optical terminal device, the optical terminal device being connected to a control device that controls the first base station in accordance with information acquired from a second base station via another transmission path, the second base station covering a cell overlapping a cell of the first base station, the information being related to one or more terminals within the cell of the first base station, the one or more terminals communicating with the first base station;
    a transfer processing circuitry that transfers a sleep control instruction from the second communication processing circuitry to the first communication processing circuitry, the sleep control instruction being issued for the first base station from the control device; and
    a setting processing circuitry that puts the second communication processing circuitry into one of an operating state and a sleep state under the control of the optical terminal device, the sleep state consuming less power than the operating state, wherein
    the branched transmission path connects the optical terminal device to the optical terminating device and another optical terminating device connected to another base station, the optical terminal device searches a table for the optical terminating device connected to the first base station in response to detection of a sleep control instruction issued for the first base station from the control device, the table indicating a first correspondence relationship between the first base station and the optical terminating devices and a second correspondence relationship between the another base station and the another optical terminating device.

5. The optical terminating device according to claim 4, further comprising a separating circuitry that separates a setting signal from a signal the second communication processing circuitry has received from the optical terminal device, the setting signal having been superimposed on the received signal, wherein, in accordance with the setting signal, the setting processing circuitry puts the second communication processing circuitry into one of the operating state and the sleep state.

6. A communication control method, wherein, a control device connected to an optical terminal device controls a plurality of first base stations in accordance with information acquired from a second base station via a first transmission path, the second base station covering a cell overlapping respective cells of the plurality of first base stations, the plurality of first base stations being respectively connected to a plurality of optical terminating devices at branch destinations of a second transmission path of the optical terminal device, the information being related to terminals within the respective cells of the plurality of first base stations, the terminals communicating with the plurality of first base stations, the optical terminal device relays communication between the first base stations and the control device, detects a sleep control instruction from the communication being relayed, the sleep control instruction being issued for one of the first base stations from the control device, and searches a table for one of the plurality of optical terminating devices connected to the one of the first base stations in response to detection of the sleep control instruction, the table indicating a correspondence relationship between the plurality of first base stations and the plurality of optical terminating devices connected to the plurality of first base stations respectively;

performs control, via the second transmission path, to cause the one of the plurality of optical terminating devices to shift to one of an operating state and a sleep state, the sleep state consuming less power than the operating state, and the one of the plurality of optical terminating devices communicates with the one of the first base stations through a first communication processing circuitry, communicates with the optical terminal device through a second communication processing circuitry via the second transmission path, transfers the sleep control instruction for the one of the first base stations from the second communication processing circuitry to the first communication processing circuitry, and under the control of the optical terminal device, puts the second communication processing circuitry into one of an operating state and a sleep state, the sleep state consuming less power than the operating state.

7. The communication control method according to claim 6, wherein, the optical terminal device generates a control signal for controlling a state of the optical terminating device connected to the one of the first base stations among the optical terminating devices, in response to detection of the sleep control instruction, and time-division multiplexes the control signal on a signal to be transmitted to the optical terminating devices among signals in the communication being relayed, and transmits a resultant signal.

8. The communication control method according to claim 6, wherein, the optical terminal device generates a control signal for controlling a state of the optical terminating device connected to the one of the first base stations among the optical terminating devices, in response to detection of the sleep control instruction, and superimposes the control signal on a signal to be transmitted to the optical terminating devices among signals in the communication being relayed.

9. The communication control method according to claim 6, wherein, the optical terminating device separates a setting signal from a signal the second communication processing circuitry has received from the optical terminal device, the setting signal having been superimposed on the received signal, and puts the second communication processing circuitry into one of the operating state and the sleep state, in accordance with the setting signal.

* * * * *